(12) United States Patent  (10) Patent No.: US 12,246,454 B2
Kamon et al.  (45) Date of Patent: Mar. 11, 2025

(54) ROBOT SYSTEM AND METHOD OF FORMING THREE-DIMENSIONAL MODEL OF WORKPIECE

(71) Applicant: Kawasaki Jukogyo Kabushiki Kaisha, Kobe (JP)

(72) Inventors: Masayuki Kamon, Kobe (JP); Hirokazu Sugiyama, Kobe (JP); Yuki Tanaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 382 days.

(21) Appl. No.: 17/784,118

(22) PCT Filed: Dec. 11, 2020

(86) PCT No.: PCT/JP2020/046282
§ 371 (c)(1),
(2) Date: Jun. 10, 2022

(87) PCT Pub. No.: WO2021/117868
PCT Pub. Date: Jun. 17, 2021

(65) Prior Publication Data
US 2023/0028457 A1  Jan. 26, 2023

(30) Foreign Application Priority Data
Dec. 13, 2019  (JP) .................. 2019-225562

(51) Int. Cl.
*B25J 9/16*  (2006.01)
*B25J 13/08*  (2006.01)

(52) U.S. Cl.
CPC .......... *B25J 9/1671* (2013.01); *B25J 9/1697* (2013.01); *B25J 13/089* (2013.01)

(58) Field of Classification Search
CPC ...... B25J 9/1671; B25J 9/1697; B25J 13/089; B25J 9/1605; B25J 13/00; B25J 9/1694;
(Continued)

(56) References Cited

U.S. PATENT DOCUMENTS

2012/0127165 A1  5/2012 Evans et al.
2016/0257000 A1*  9/2016 Guerin .................. B25J 9/1671
(Continued)

FOREIGN PATENT DOCUMENTS

JP  2019-177477 A  10/2019

OTHER PUBLICATIONS

Extended European Search Report issued May 3, 2024 in European Patent Application No. 20898730.5, 12 pages.

*Primary Examiner* — Ping Y Hsieh
*Assistant Examiner* — Vaisali Rao Koppolu
(74) *Attorney, Agent, or Firm* — XSENSUS LLP

(57) ABSTRACT

A robot system includes a robot installed in a work area and controlled by a second control device, a 3D camera operated by an operator, a sensor that is disposed in a manipulation area that is a space different from the work area, and wirelessly detects position information and posture information on the 3D camera, a display, and a first control device. The first control device acquires image information on a workpiece imaged by the 3D camera, acquires, from the sensor, the position information and the posture information when the workpiece is imaged by the 3D camera, displays the acquired image information on the display, forms a three-dimensional model of the workpiece based on the image information, and the acquired position information and posture information, displays the formed three-dimensional model on the display, and outputs first data that is data of the formed three-dimensional model to the second control device.

14 Claims, 21 Drawing Sheets

(58) Field of Classification Search
CPC . B25J 9/1689; B25J 13/065; B25J 9/16; B25J 11/00; B25J 13/08; G05B 2219/40131; G05B 2219/40195
See application file for complete search history.

(56) References Cited

U.S. PATENT DOCUMENTS

| | | | |
|---|---|---|---|
| 2017/0292827 A1* | 10/2017 | Haverkamp | G06T 7/60 |
| 2018/0304467 A1* | 10/2018 | Matsuura | B25J 13/06 |
| 2021/0201692 A1* | 7/2021 | Hashimoto | A63F 13/25 |
| 2021/0323146 A1* | 10/2021 | Hayashi | B25J 9/1605 |
| 2022/0024037 A1* | 1/2022 | Lee | B25J 13/08 |

* cited by examiner

ROBOT SYSTEM AND METHOD OF FORMING THREE-DIMENSIONAL MODEL OF WORKPIECE

CROSS-REFERENCE TO RELATED APPLICATIONS

This application is based on PCT filing PCT/JP2020/046282, filed on Dec. 11, 2020, and claims the benefit of priority to Japanese Patent Application No. 2019-225562 filed on Dec. 13, 2019 with in Japan Patent Office, each of which is incorporated as a part of this application by reference in the entirety.

TECHNICAL FIELD

The present disclosure relates to a robot system, and a method of forming a three-dimensional model of a workpiece.

BACKGROUND ART

Display systems in which a three-dimensional image indicating a work cell of a robot is displayed on various personal digital assistants are known (for example, see Patent Document 1). The display system disclosed in Patent Document 1 has a display which generates a three-dimensional robot model and robot work cell data containing models of other structures of the work cell, and displays a three-dimensional rendering image, such as the generated three-dimensional robot model.

Further, in the display system disclosed in Patent Document 1, when a user (operator) operates the robot displayed on the display by using a user interface, a collision object (for example, a safety wall) is indicated on the display before the robot operates. Then, when the physical robot collides the collision object due to the operation of the user, the collision is displayed on the display.

REFERENCE DOCUMENT(S) OF CONVENTIONAL ART

Patent Document

[Patent Document 1] JP2019-177477A

DESCRIPTION OF THE DISCLOSURE

However, in the display system disclosed in Patent Document 1, a programmer must create the three-dimensional data, such as a three-dimensional robot model and an animated three-dimensional robot model. Therefore, when the kinds of the workpieces which are used as targets to be worked by the robot increase, the data needed to be created also increases significantly, thereby increasing the preparation expense of the data. Particularly, when the workpieces are small in number, a ratio of the preparation expense of the data among the production cost becomes larger.

Therefore, there is still room for an improvement in the display system disclosed in Patent Document 1 in terms of an improvement in the production efficiency.

The present disclosure is to solve the above problem, and one purpose thereof is to provide a robot system and a method of forming a three-dimensional model of a workpiece, capable of improving the production efficiency, as compared with the conventional display system.

A robot system according to the present disclosure includes a robot installed in a workarea and controlled by a second control device, a 3D camera operated by an operator, a sensor that is disposed in a manipulation area that is a space different from the workarea, and wirelessly detects position information and posture information on the 3D camera, a display, and a first control device. The first control device acquires image information on a workpiece imaged by the 3D camera, acquires, from the sensor, the position information and the posture information when the workpiece is imaged by the 3D camera, displays the acquired image information on the display, forms a three-dimensional model of the workpiece based on the image information, and the acquired position information and posture information, displays the formed three-dimensional model on the display, and outputs first data that is data of the formed three-dimensional model to the second control device.

According to this robot system, since it is not necessary to create the three-dimensional model data of the workpiece by a programmer, the cost for creating the data can be reduced. Thus, as compared with the conventional display system, it can improve the production efficiency.

A method of forming a three-dimensional model of a workpiece according to the present disclosure includes the steps of detecting position information and posture information on a 3D camera, when the 3D camera images the workpiece disposed in a manipulation area that is a space different from a workarea where a robot is installed, acquiring image information on the imaged workpiece, acquiring the detected position information and posture information, displaying the acquired image information on a display, and forming the three-dimensional model of the workpiece based on the acquired image information, and the acquired position information and posture information.

According to this method of forming the three-dimensional model of the workpiece, since it is not necessary to create the three-dimensional model data of the workpiece by a programmer, the cost for creating the data can be reduced. Thus, as compared with the conventional display system, it can improve the production efficiency.

MODES FOR CARRYING OUT THE DISCLOSURE

Figure 1:
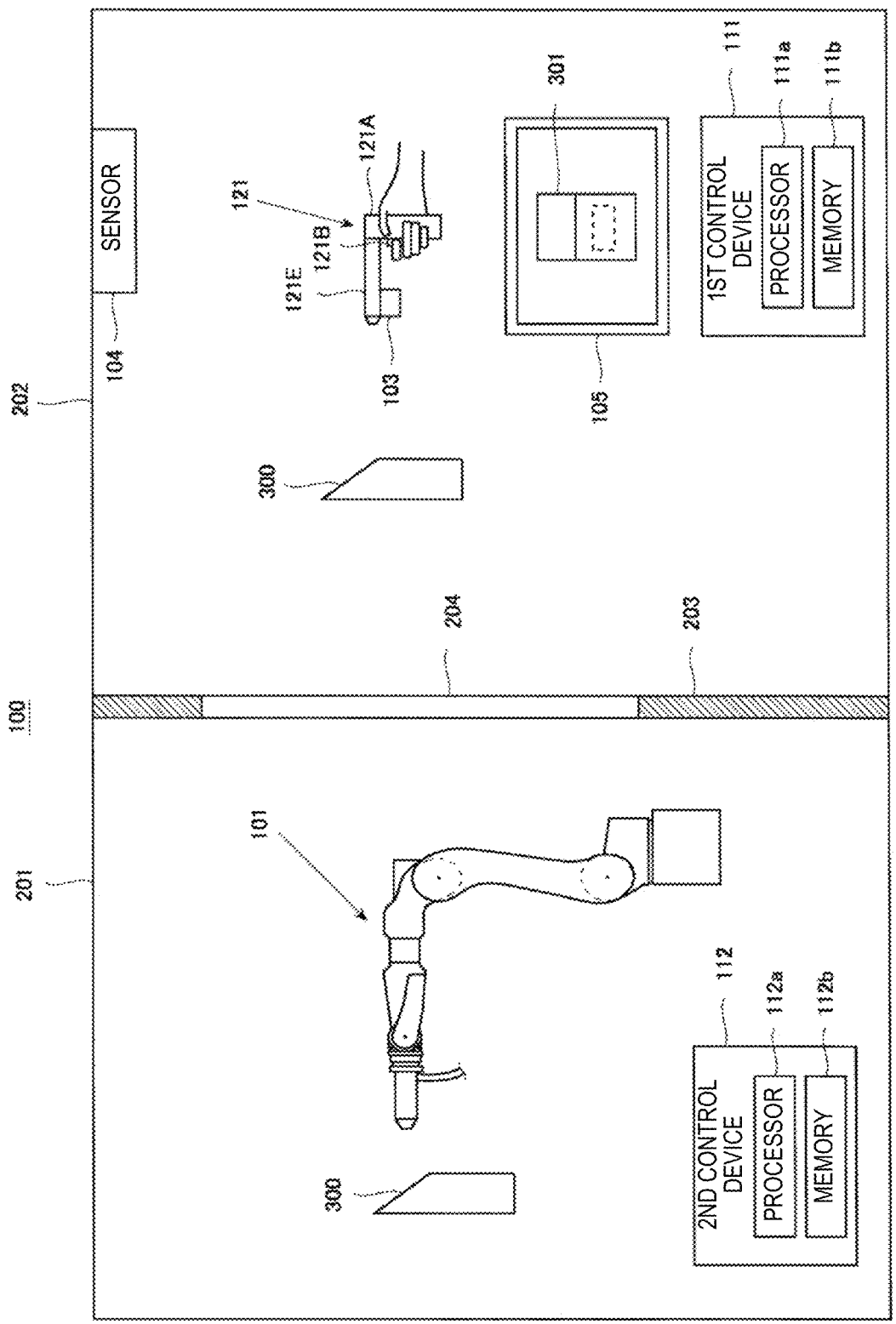
FIG. 1 is a schematic diagram illustrating an outline configuration of a robot system according to Embodiment 1.

Hereinafter, embodiments of the present disclosure will be described with reference to the drawings. Note that, throughout the drawings, the same reference characters are given to the same or corresponding parts to omit redundant explanations. Further, throughout the drawings, components for describing the present disclosure are selectively illustrated, and illustration about other components may be omitted. Moreover, the present disclosure is not limited to the following embodiments.

Embodiment 1

[Configuration of Robot System]

FIG. 1 is a schematic diagram illustrating an outline configuration of a robot system according to Embodiment 1. The robot system 100 includes a robot 101, a first interface 121, a 3D camera 103, a sensor 104, a display 105, a first control device 111, and a second control device 112. The robot 101 and the second control device 112 are installed inside a workarea 201, and the sensor 104, the display 105, and the first control device 111 are disposed inside a manipulation area 202. Further, the first interface 121 is gripped (held) and operated by an operator inside the manipulation area 202. The 3D camera 103 is disposed at a tip-end part of the first interface 121.

Note that, in Embodiment 1, although the 3D camera 103 is provided to the tip-end part of the first interface 121, the 3D camera 103 may not be provided to the first interface 121, and the 3D camera 103 may be provided separately from the first interface 121.

The workarea 201 is a space where the robot 101 is installed, and includes at least a space inside an operating range of the robot 101. Further, the manipulation area 202 is a space separated from the workarea 201 (a space different from the workarea 201). The workarea 201 and the manipulation area 202 may be divided by a wall member 203.

The wall member 203 is provided with a window 204, and therefore, the operator is visible of the robot 101 disposed inside the workarea 201. Note that the workarea 201 may be an explosion-proof area where an explosion-proof specification is applied, and the manipulation area 202 may be a non-explosion-proof area where the explosion-proof specification is not applied.

The sensor 104 wirelessly detects position information and posture information on the 3D camera 103 (for example, lens), and outputs them to the first control device 111. Further, the sensor 104 wirelessly detects position information and posture information on the tip-end part of the first interface 121, and outputs them to the second control device 112. Note that the sensor 104 may perform the output to the first control device 111 and/or the second control device 112 wirelessly or wiredly.

The sensor 104 may be an infrared sensor or a camera, for example. Note that, if the sensor 104 is the camera, the sensor 104 may not be disposed inside the manipulation area 202. For example, the camera may be a camera installed in a personal digital assistant or a head mounted display which the operator carries. Further, the sensor 104 which detects the position information on the 3D camera 103 and the sensor 104 which detects the position information on the tip-end part of the first interface 121 may be comprised of the same sensor, or may be comprised of different sensors.

As for the first interface 121, the operator grips a gripper 121A and operates the robot 101. In detail, by the robot 101 operating to follow the locus of a tip-end part of an interface body 121E of the gripped first interface 121, the operator can manipulate the robot 101 intuitively by the first interface 121 inside the manipulation area 202.

In the gripper 121A, an apparatus which transmits to the operator inner force sense information detected by a force sensor provided to an end effector 20 of the robot 101 which is described later, or voice information may be disposed. This apparatus includes, for example, a vibration motor, a speaker, and a mechanism which expands and contracts a casing which constitutes the gripper.

Further, the first interface 121 may be provided with a switch 121B which starts/stops spraying or injecting grains, fluid, or gas to a workpiece 300, or cutting or polishing of the workpiece 300.

Note that the first interface 121 may be configured to be portable by the operator. Further, the interface body 121E of the first interface 121 may be formed in the same shape as the end effector 20 of the robot 101. Moreover, the first interface 121 may use known interfaces, such as a joystick, a keyboard, ten keys, and a teach pendant, for example.

The 3D camera 103 outputs image information imaged inside the manipulation area 202 to the first control device 111. Note that, the term "image information" as used herein includes at least one of still image information, moving image information, and video information. Further, the term "image information" in the following explanation is similar. When the 3D camera 103 images the workpiece 300 etc. inside the manipulation area 202, the sensor 104 detects the position information and the posture information on the 3D camera 103 wirelessly, and outputs them to the first control device 111.

The display 105 displays the three-dimensional model of the workpiece 300 and the robot 101 outputted from the first control device 111, and the image information on the workpiece 300 etc. imaged by the 3D camera 103. The display 105 may be comprised of a non-portable display, which is installed and used on a desk, a floor, etc., for example. Further, the display 105 may be comprised of a head mounted display or glasses which the operator wears and uses.

The end effector 20 of the robot 101 may have a structure capable of spraying or injecting grains, fluid, or gas to the workpiece 300, or may have a structure capable of cutting or polishing the workpiece 300, or may have a structure capable of welding the workpiece 300, or may have a structure capable of washing the workpiece 300. Here, a configuration of the robot 101 is described in detail with reference to FIG. 2.

Figure 2:
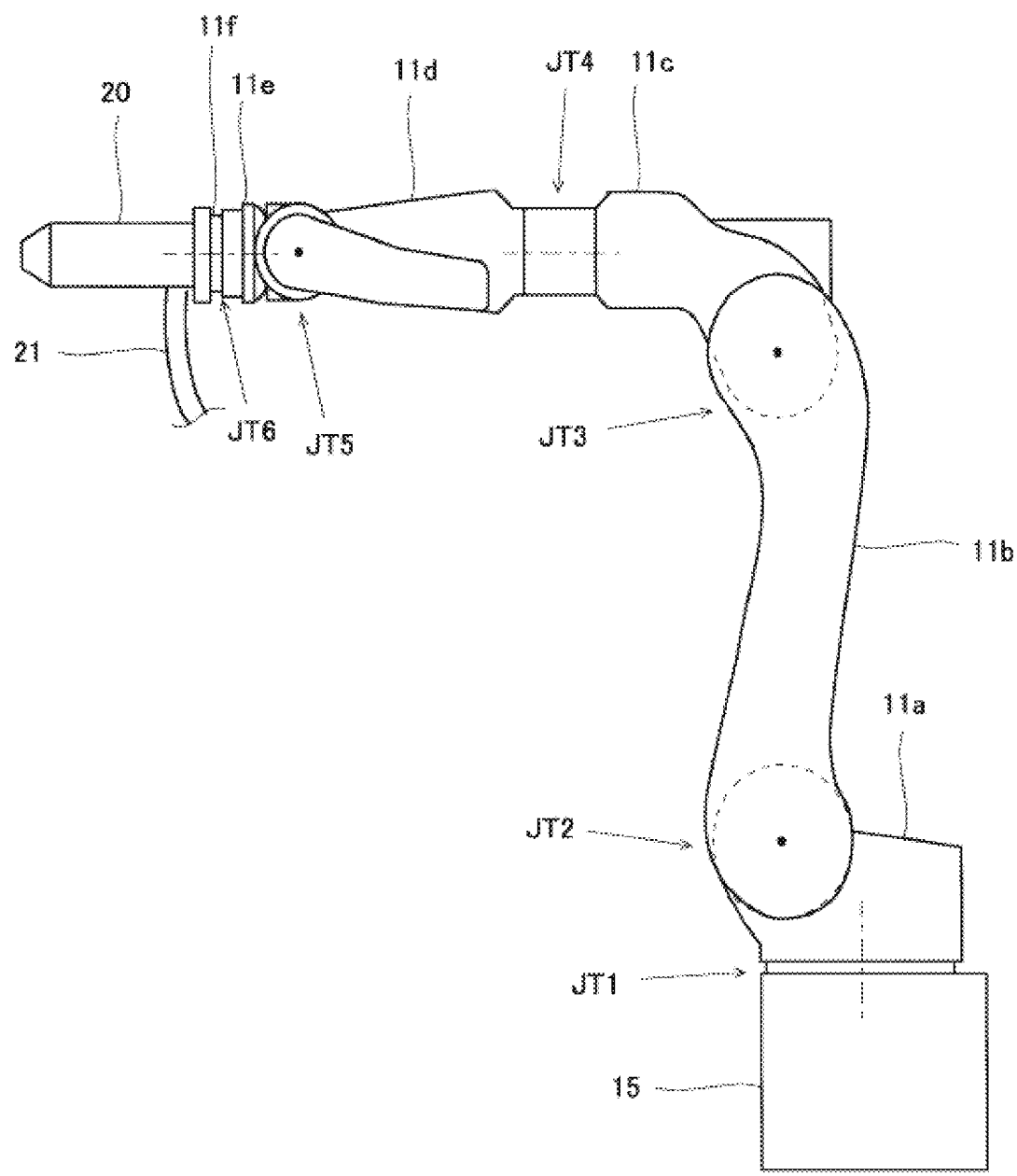
FIG. 2 is a schematic diagram illustrating an outline configuration of the robot in the robot system illustrated in FIG. 1.

FIG. 2 is a schematic diagram illustrating an outline configuration of the robot in the robot system illustrated in FIG. 1.

As illustrated in FIG. 2, the robot 101 is a vertical articulated robotic arm provided with a serially-coupled body comprised of a plurality of links (here, a first link 11a, a second link 11b, a third link 11c, a fourth link 11d, a fifth link 11e, and a sixth link 11f), a plurality of joints (here, a first joint JT1, a second joint JT2, a third joint JT3, a fourth joint JT4, a fifth joint JT5, and a sixth joint JT6), and a pedestal 15 which supports the serially-coupled body and the joints. Note that, in Embodiment 1, although the vertical articulated robot is adopted as the robot 101, it is not limited to this configuration, but it may adopt a horizontal articulated robot.

In the first joint JT1, the pedestal 15 and a base-end part of the first link 11a are coupled to each other swivelably on an axis extending in the vertical direction. In the second joint JT2, a tip-end part of the first link 11a and a base-end part of the second link 11b are coupled to each other pivotably on an axis extending in the horizontal direction. In the third joint JT3, a tip-end part of the second link 11b and a base-end part of the third link 11c are coupled to each other pivotably on an axis extending in the horizontal direction.

In the fourth joint JT4, a tip-end part of the third link 11c and a base-end part of the fourth link 11d are coupled to each other rotatably on an axis extending in the longitudinal direction of the fourth link 11d. In the fifth joint JT5, a tip-end part of the fourth link 11d and a base-end part of the fifth link 11e are coupled to each other pivotably on an axis perpendicular to the longitudinal direction of the fourth link 11d. In the sixth joint JT6, a tip-end part of the fifth link 11e and a base-end part of the sixth link 11f are twistably coupled to each other.

A mechanical interface is provided to a tip-end part of the sixth link 11f. The end effector 20 is detachably attached to the mechanical interface, corresponding to the contents of work.

Here, the end effector 20 sprays or injects fluid (for example, paint) to the workpiece 300. Further, the end effector 20 is connected to piping 21 for feeding the fluid to the end effector 20.

Further, the first joint JT1, the second joint JT2, the third joint JT3, the fourth joint JT4, the fifth joint JT5, and the sixth joint JT6 are each provided with a drive motor (not illustrated) as one example of an actuator which relatively rotates two members coupled to each other via the joint. The drive motor may be a servomotor which is servo-controlled by the second control device 112, for example. Further, the first joint JT1, the second joint JT2, the third joint JT3, the fourth joint JT4, the fifth joint JT5, and the sixth joint JT6 are each provided with a rotation sensor (not illustrated) which detects a rotational position of the drive motor, and a current sensor (not illustrated) which detects current for controlling the rotation of the drive motor. The rotation sensor may be an encoder, for example.

The first control device 111 includes a processor 111a such as a microprocessor and a CPU, and a memory 111b such as a ROM and a RAM. The memory 111b stores information on a basic program, various fixed data, etc. The processor 111a reads and executes software, such as the basic program stored in the memory 111b.

Further, the processor 111a forms a three-dimensional model (3D computer graphics or 3DCAD data) of the workpiece 300 based on image information inputted from the 3D camera 103, and position information and posture information inputted from the sensor 104 when the 3D camera 103 images the workpiece 300. The memory 111b stores the three-dimensional model of the workpiece 300 formed by the processor 111a.

Further, the processor 111a outputs the formed three-dimensional model of the workpiece 300 to the display 105. The display 105 displays the three-dimensional model of the workpiece 300 inputted from the processor 111a as a 3D workpiece 301 (see FIG. 6 etc.).

The second control device 112 includes, similar to the first control device 111, a processor 112a such as a microprocessor and a CPU, and a memory 112b such as a ROM and a RAM. The memory 112b stores information on a basic program, various fixed data, etc. The processor 112a performs various kinds of operations of the robot 101 by reading and executing software, such as the basic program, stored in the memory 112b.

Note that the first control device 111 and/or the second control device 112 may be comprised of a sole control device which carries out a centralized control, or may be comprised of a plurality of control devices which collaboratively carry out a distributed control. Further, the first control device 111 and/or the second control device 112 may be comprised of a microcomputer, or may be comprised of an MPU, a PLC (Programmable Logic Controller), a logical circuit, etc.

Moreover, although the robot system 100 according to Embodiment 1 is provided with both the first control device 111 and the second control device 112, it is not limited to this configuration. The first control device 111 may have the function of the second control device 112 (that is, the robot system 100 may only be provided with the first control device 111). Similarly, the second control device 112 may have the function of the first control device 111 (that is, the robot system 100 may only be provided with the second control device 112).

[Operation (Method of Forming Three-Dimensional Model of Workpiece) and Effects of Robot System]

Next, operation and effects of the robot system 100 according to Embodiment 1 are described in detail with reference to FIGS. 1 to 9. Note that the following operation is performed by the processor 111a of the first control device 111 reading the program stored in the memory 111b.

Figure 3:
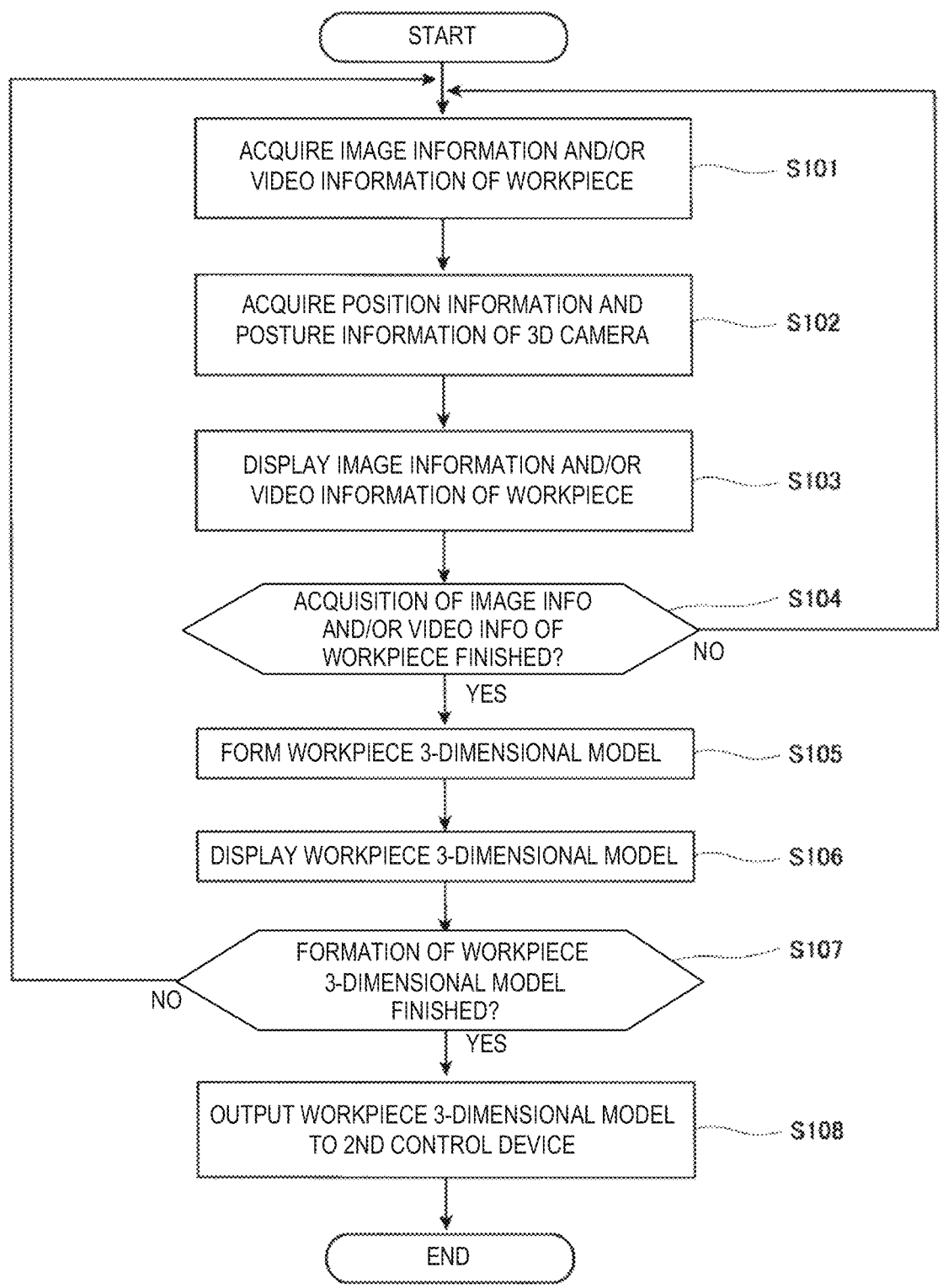
FIG. 3 is a flowchart illustrating one example of operation of the robot system according to Embodiment 1.

FIG. 3 is a flowchart illustrating one example of the operation of the robot system according to Embodiment 1 (the method of forming the three-dimensional model of the workpiece). FIGS. 4 to 9 are schematic diagrams each illustrating a state inside the manipulation area when the robot system operates in accordance with the flowchart illustrated in FIG. 3. Note that, in FIGS. 4 to 9, a front-and-rear direction, a left-and-right direction, and an up-anddown direction of the workpiece are expressed as a front-and-rear direction, a left-and-right direction, and an up-and-down direction in the drawings.

Figure 4:
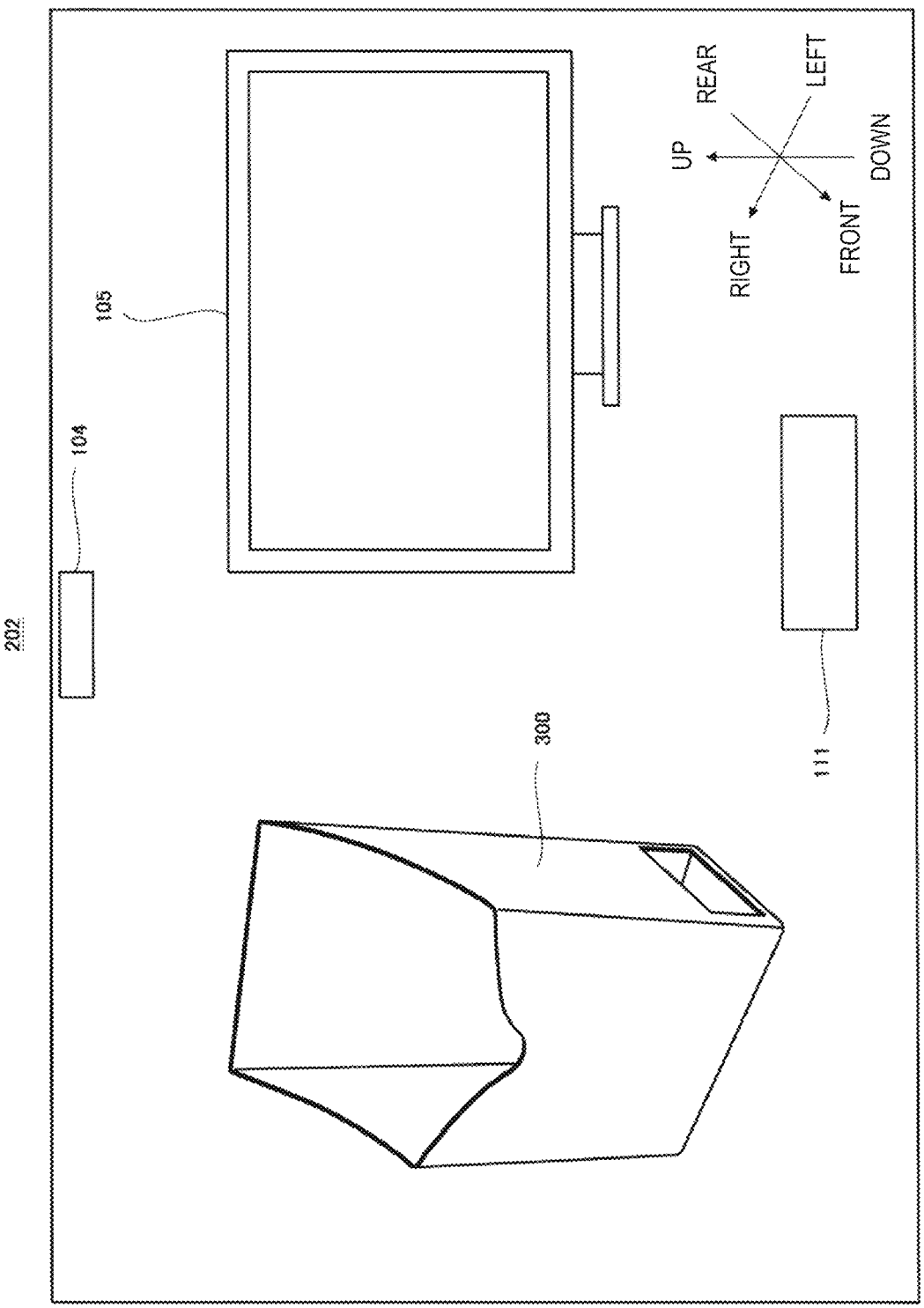
FIG. 4 is a schematic diagram illustrating a state inside a manipulation area when the robot system operates in accordance with the flowchart illustrated in FIG. 3.
Figure 5:
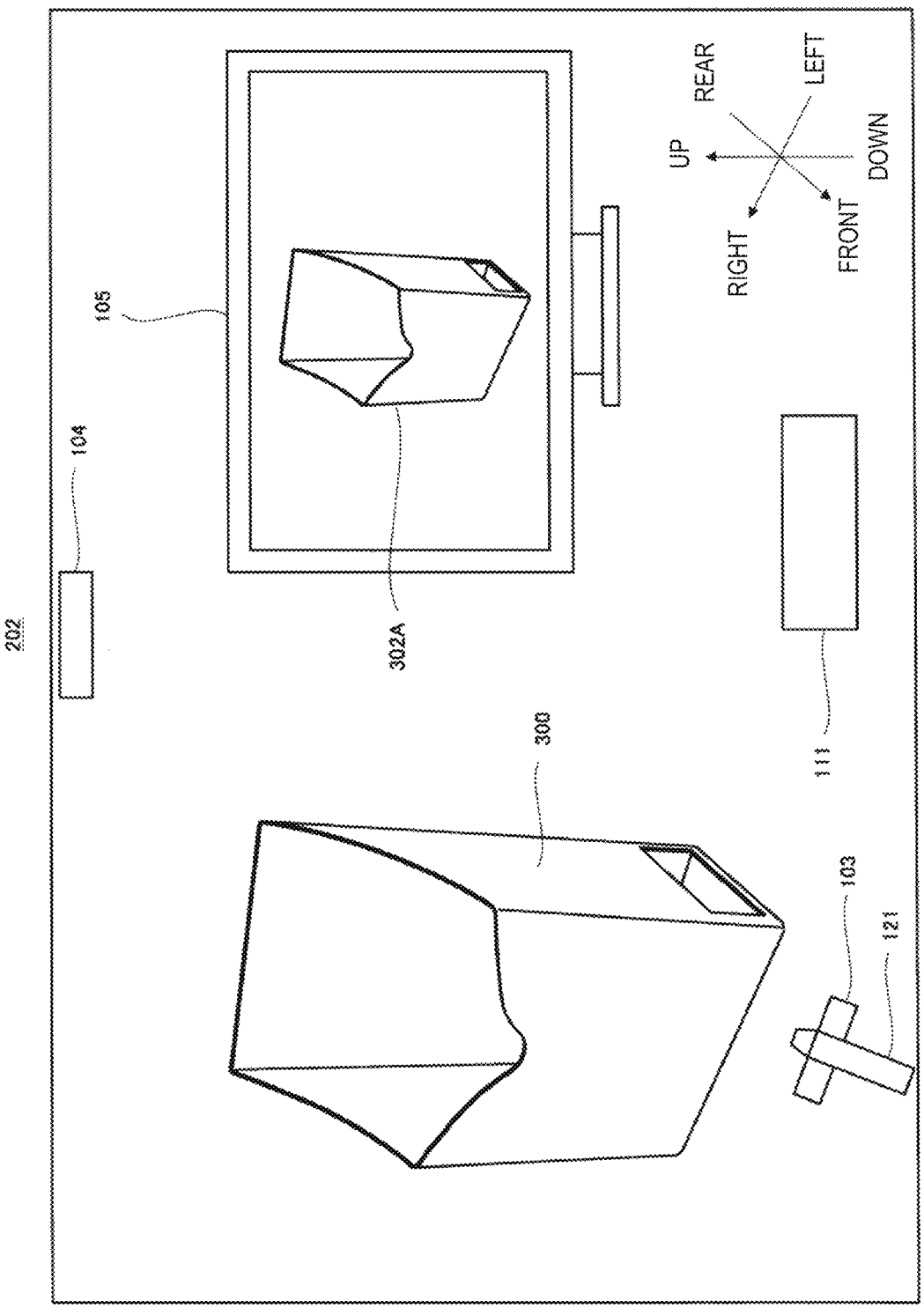
FIG. 5 is a schematic diagram illustrating the state inside the manipulation area when the robot system operates in accordance with the flowchart illustrated in FIG. 3.

First, as illustrated in FIG. 4, inside the manipulation area 202, a box-shaped workpiece 300 which opens at an upper part thereof is disposed. As illustrated in FIG. 5, in order for the operator (worker) to create the three-dimensional model of the workpiece 300, he/she grips the first interface 121 where the 3D camera 103 is installed, and images the workpiece 300 from the front of the workpiece 300.

Here, the operator may use the 3D camera 103 to acquire the image information on (image) one workpiece 300, or may discontinuously acquire image information on (image) a plurality of workpieces 300, or may acquire video information on (image) the workpiece 300. Further, the operator may use the 3D camera 103 to image the workpiece 300 from directions other than the front of the workpiece 300.

Then, the first control device 111 acquires, from the 3D camera 103, the image information on the workpiece 300 imaged by the 3D camera 103 (Step S101). Next, the first control device 111 acquires, from the sensor 104, the position information and the posture information on the 3D camera 103 when imaging the image information acquired at Step S101 (Step S102).

Next, the first control device 111 displays the image information on the workpiece 300 acquired at Step S101 on the display 105, as a workpiece image 302A (Step S103; see FIG. 5).

Next, the first control device 111 determines whether an acquisition end command of the image information on the workpiece 300 (imaging end information on the workpiece 300) is inputted by the operator from an input device etc. (not illustrated) (Step S104).

If determined that the imaging end information on the workpiece 300 is inputted from the input device etc. (Yes at Step S104), the first control device 111 forms the three-dimensional model (3D computer graphics or 3DCAD) of the workpiece 300 based on the image information on the workpiece 300 acquired at Step S101, and the position information and the posture information on the 3D camera 103 which are acquired at Step S102 (Step S105).

Figure 6:
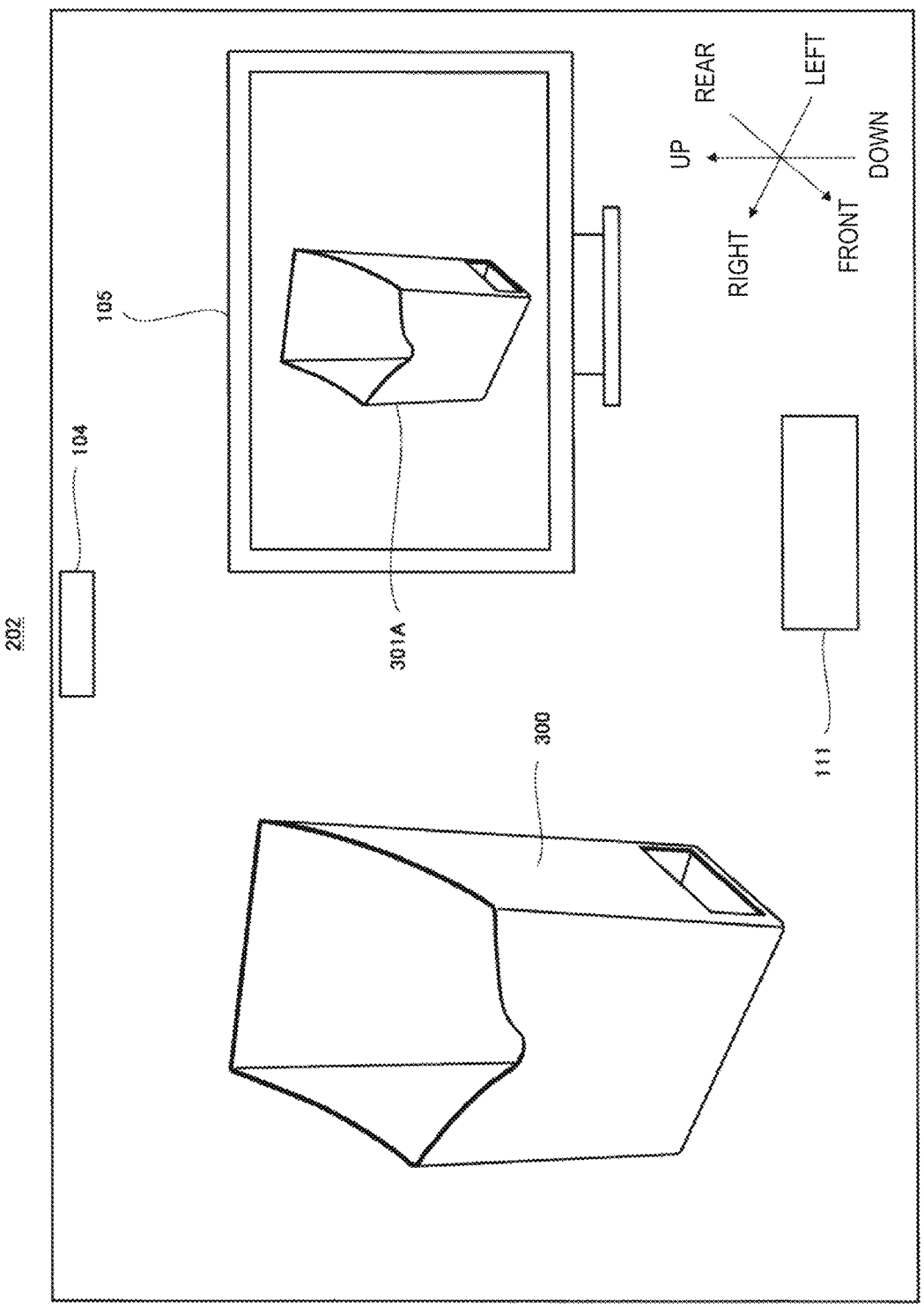
FIG. 6 is a schematic diagram illustrating the state inside the manipulation area when the robot system operates in accordance with the flowchart illustrated in FIG. 3.

Next, the first control device 111 displays the three-dimensional model of the workpiece 300 formed at Step S105 on the display 105 as a 3D workpiece 301A (Step S106; see FIG. 6).

Next, the first control device 111 determines whether a formation end command of the three-dimensional model of the workpiece 300 (formation end information on the three-dimensional model) is inputted by the operator from the input device etc. (not illustrated) (Step S107).

If determined that the three-dimensional model formation end information is not inputted from the input device etc. (No at Step S107), the first control device 111 returns to the processing of Step S101. On the other hand, if determined that the three-dimensional model formation end information is inputted from the input device etc. (Yes at Step S107), the first control device 111 transits to processing of Step S108.

At Step S108, the first control device 111 outputs the three-dimensional model of the workpiece 300 formed at Step S105 to the second control device 112, and ends this program. Therefore, the second control device 112 can perform the control of the operation of the robot 101 based on the three-dimensional model data of the workpiece 300.

On the other hand, at Step S104, for example, after displaying the workpiece image 302A on the display 105, if the operator further images the workpiece 300 and the image information on the imaged workpiece 300 is inputted from the 3D camera 103, the first control device 111 may determine that the imaging end information on the workpiece 300 is not inputted from the input device etc.

If determined that the imaging end information on the workpiece 300 is not inputted (No at Step S104), the first control device 111 returns to the processing of Step S101.

Figure 7:
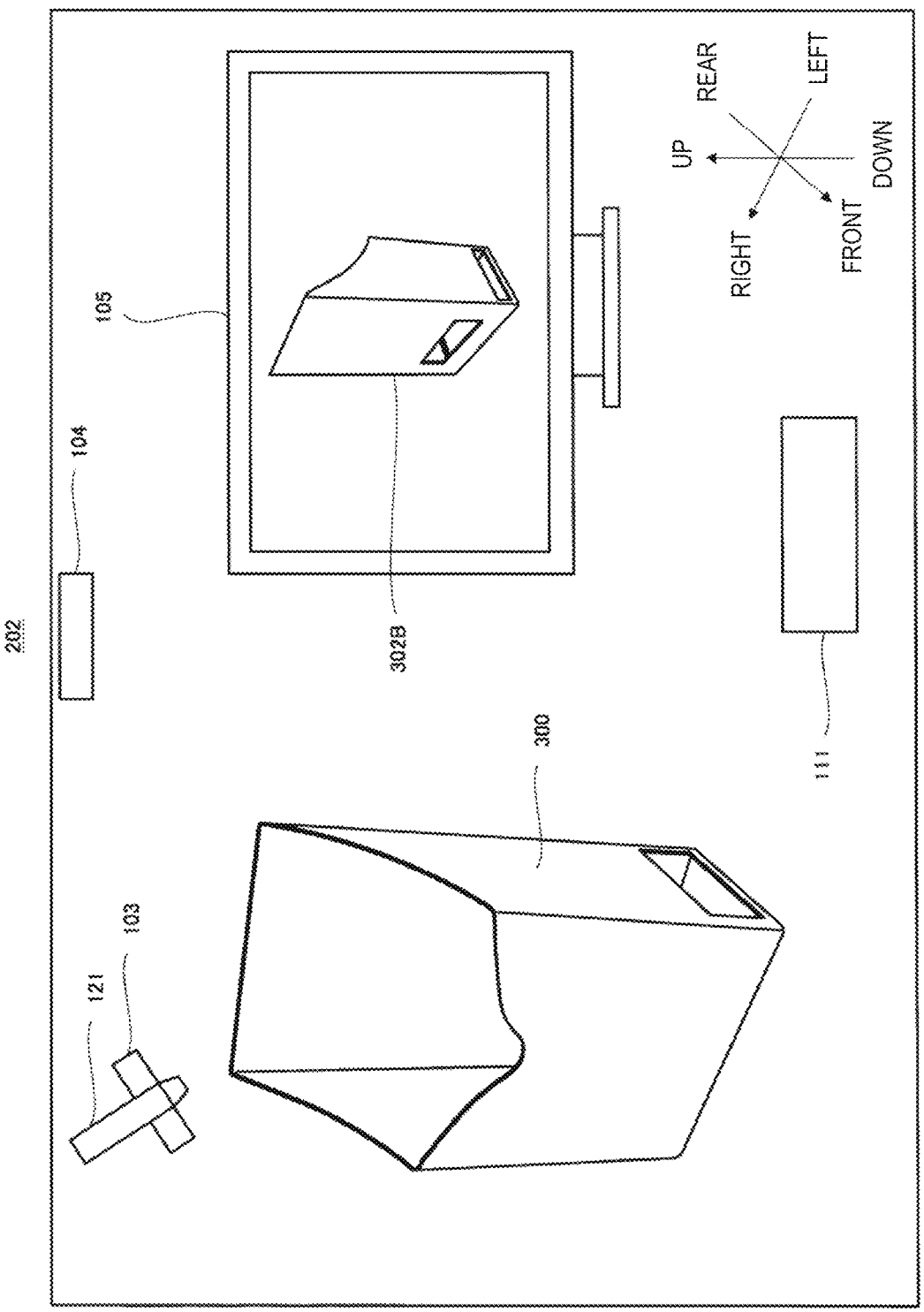
FIG. 7 is a schematic diagram illustrating the state inside the manipulation area when the robot system operates in accordance with the flowchart illustrated in FIG. 3.

For example, as illustrated in FIG. 7, if the operator further images the workpiece 300 from rearward and rightward of the workpiece 300, the image information on the imaged workpiece 300 is inputted into the first control device 111 (Step S101).

Next, the first control device 111 acquires, from the sensor 104, the position information and the posture information on the 3D camera 103 when imaging the image information acquired at second Step S101 (Step S102).

Next, the first control device 111 displays the image information on the workpiece 300 acquired at the second Step S101 on the display 105, as a workpiece image 302B (Step S103; see FIG. 7). Therefore, it can be seen that a rectangular through-hole is formed in a lower part of a rear surface of the workpiece 300.

Then, the first control device 111 again determines whether the acquisition end command of the image information on the workpiece 300 is inputted from the input device which is not illustrated (Step S104).

Figure 8:
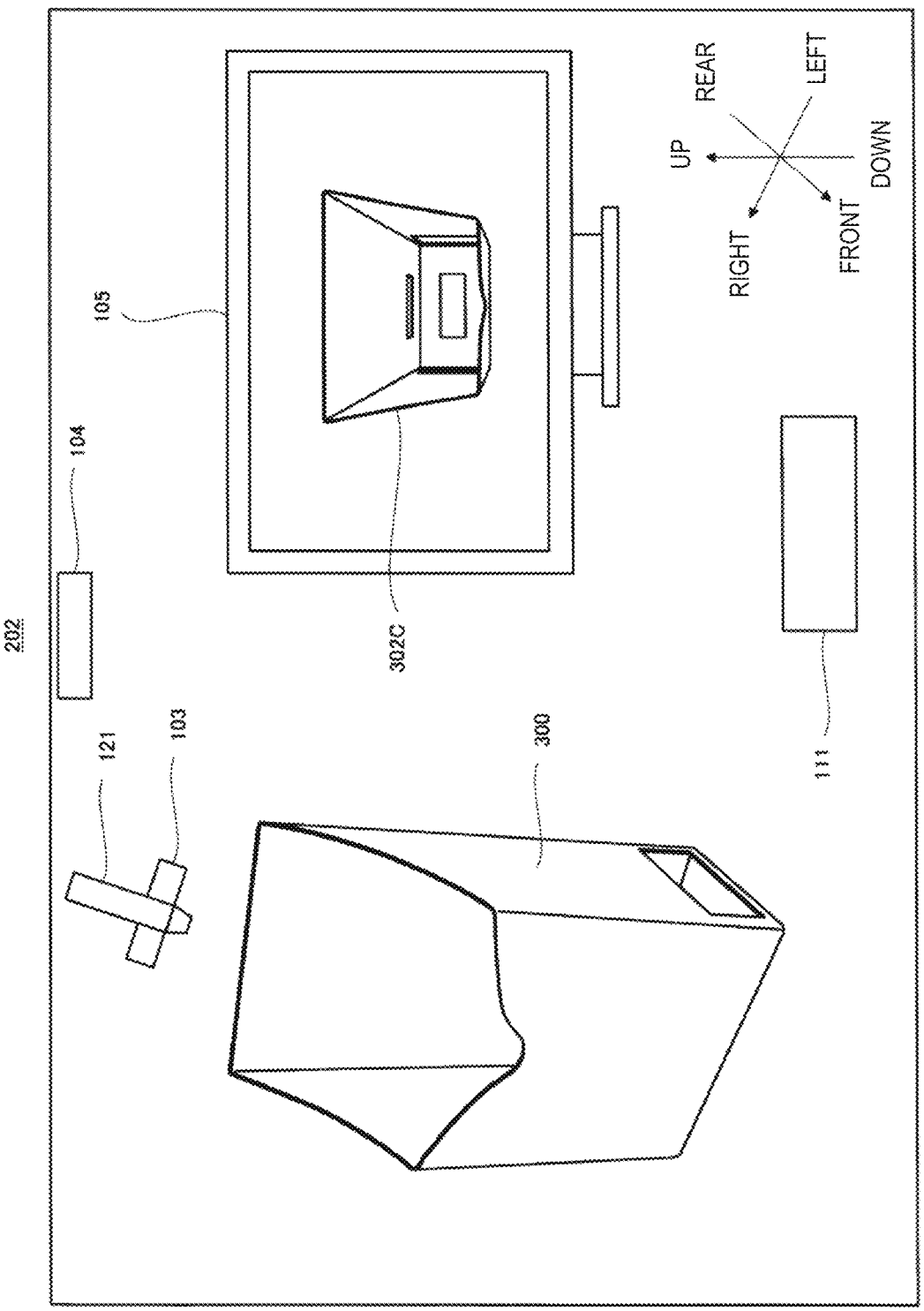
FIG. 8 is a schematic diagram illustrating the state inside the manipulation area when the robot system operates in accordance with the flowchart illustrated in FIG. 3.

Next, for example, as illustrated in FIG. 8, if the operator further images the workpiece 300 from above of the workpiece 300, the image information on the imaged workpiece 300 is inputted into the first control device 111 (Step S101).

Next, the first control device 111 acquires, from the sensor 104, the position information and the posture information on the 3D camera 103 when imaging the image information acquired at the third Step S101 (Step S102).

Next, the first control device 111 displays the image information on the workpiece 300 acquired at the third Step S101 on the display 105 as a workpiece image 302C (Step S103; see FIG. 8). Therefore, it can be seen that a rectangular through-hole is formed in a bottom surface of the workpiece 300. Further, the operator can see that imaging of all the parts of the workpiece 300 is finished. Thus, the operator makes the input device etc. output the imaging end information on the workpiece 300 to the first control device 111.

Therefore, the first control device 111 determines that the imaging end information on the workpiece 300 is inputted from the input device etc. (Yes at Step S104), and forms the three-dimensional model of the workpiece 300 based on the image information on the workpiece 300 acquired at Step S101, and the position information and the posture information on the 3D camera 103 which are acquired at Step S102 (Step S105).

Here, for example, the first control device 111 may form the three-dimensional model of the workpiece 300 based on the image information on the workpiece 300 acquired each time, and the position information and the posture information on the 3D camera 103 which are acquired each time.

Further, for example, the first control device 111 may form a three-dimensional model of the workpiece 300 each time based on the image information on the workpiece 300, and the position information and the posture information on the 3D camera 103, and may again form a three-dimensional model of the workpiece 300 based on a group of the formed three-dimensional models of the workpiece 300.

Moreover, for example, the first control device 111 may perform processing which forms a three-dimensional model of the workpiece 300 based on image information on the workpiece 300 acquired at the Ath time (for example, the first time), and the position information and the posture information on the 3D camera 103 (Step S105), and may perform processing which again forms a three-dimensional model of the workpiece 300 based on the three-dimensional model of the workpiece 300 formed by the processing which forms the three-dimensional model (Step S105), image information on the workpiece 300 acquired at the Bth time (B≠A; for example, the second time and the third time), and the position information and the posture information on the 3D camera 103.

Similarly, for example, the first control device 111 may perform processing which forms a three-dimensional model of the workpiece 300 based on image information on the workpiece 300 acquired at the Ath time (for example, the first time and the second time), and the position information and the posture information on the 3D camera 103 (Step S105), and may perform processing which again forms a three-dimensional model of the workpiece 300 based on the three-dimensional model of the workpiece 300 formed by the processing which forms the three-dimensional model (Step S105), and image information on the workpiece 300 acquired at the Bth time (B≠A; for example, the third time).

Further, for example, the first control device 111 may perform processing which forms a three-dimensional model of the workpiece 300 based on image information on the workpiece 300 acquired at the Cth time (for example, the first time), and the position information and the posture information on the 3D camera 103 (Step S105), may perform processing which forms a three-dimensional model of the workpiece 300 based on image information on the workpiece 300 acquired at the Dth time (D≠C; for example, the second time and the third time), and the position information and the posture information on the 3D camera 103 (Step S105), and may perform processing which again forms a three-dimensional model of the workpiece 300 based on the three-dimensional model of the workpiece 300 formed at Step S105 based on the image information on the workpiece 300 acquired at the Cth time, and the position information and the posture information on the 3D camera 103, and the three-dimensional model of the workpiece 300 formed at Step S105 based on the image information on the workpiece 300 acquired at the Dth time, and the position information and the posture information on the 3D camera 103.

Similarly, for example, the first control device 111 may perform processing which forms a three-dimensional model of the workpiece 300 based on image information on the workpiece 300 acquired at the Cth time (for example, the first time and the second time), and the position information and the posture information on the 3D camera 103 (Step S105), may perform processing which forms a three-dimensional model of the workpiece 300 based on image information on the workpiece 300 acquired at the Dth time (D≠C; for example, the third time), and the position information and the posture information on the 3D camera 103 (Step S105), and may perform processing which again forms a three-dimensional model of the workpiece 300 based on the three-dimensional model of the workpiece 300 formed at Step S105 based on the image information on the workpiece 300 acquired at the Cth time, and the position information and the posture information on the 3D camera 103, and the three-dimensional model of the workpiece 300 formed at Step S105 based on the image information on the workpiece 300 acquired at the Dth time, and the position information and the posture information on the 3D camera 103.

Further, the first control device 111 may perform the above-described processing which forms the three-dimensional model of the workpiece 300 based on the image information on the workpiece 300 acquired at the Ath time, and the position information and the posture information on the 3D camera 103 (Step S105), and may perform processing which again forms the three-dimensional model of the workpiece 300 based on the three-dimensional model of the workpiece 300 which is again formed by the processing which again forms the three-dimensional model of the workpiece 300 based on the three-dimensional model of the workpiece 300 formed by the processing which forms the three-dimensional model (Step S105), the image information on the workpiece 300 acquired at the Bth time, and the position information and the posture information on the 3D camera 103, and the three-dimensional model of the workpiece 300 which is again formed by the processing which again forms the three-dimensional model of the workpiece 300 based on the three-dimensional model of the workpiece 300 formed at Step S105 based on the image information on the workpiece 300 acquired at the Cth time, and the position information and the posture information on the 3D camera 103, and the three-dimensional model of the workpiece 300 formed at Step S105 based on the image information on the workpiece 300 acquired at the Dth time, and the position information and the posture information on the 3D camera 103.

Figure 9:
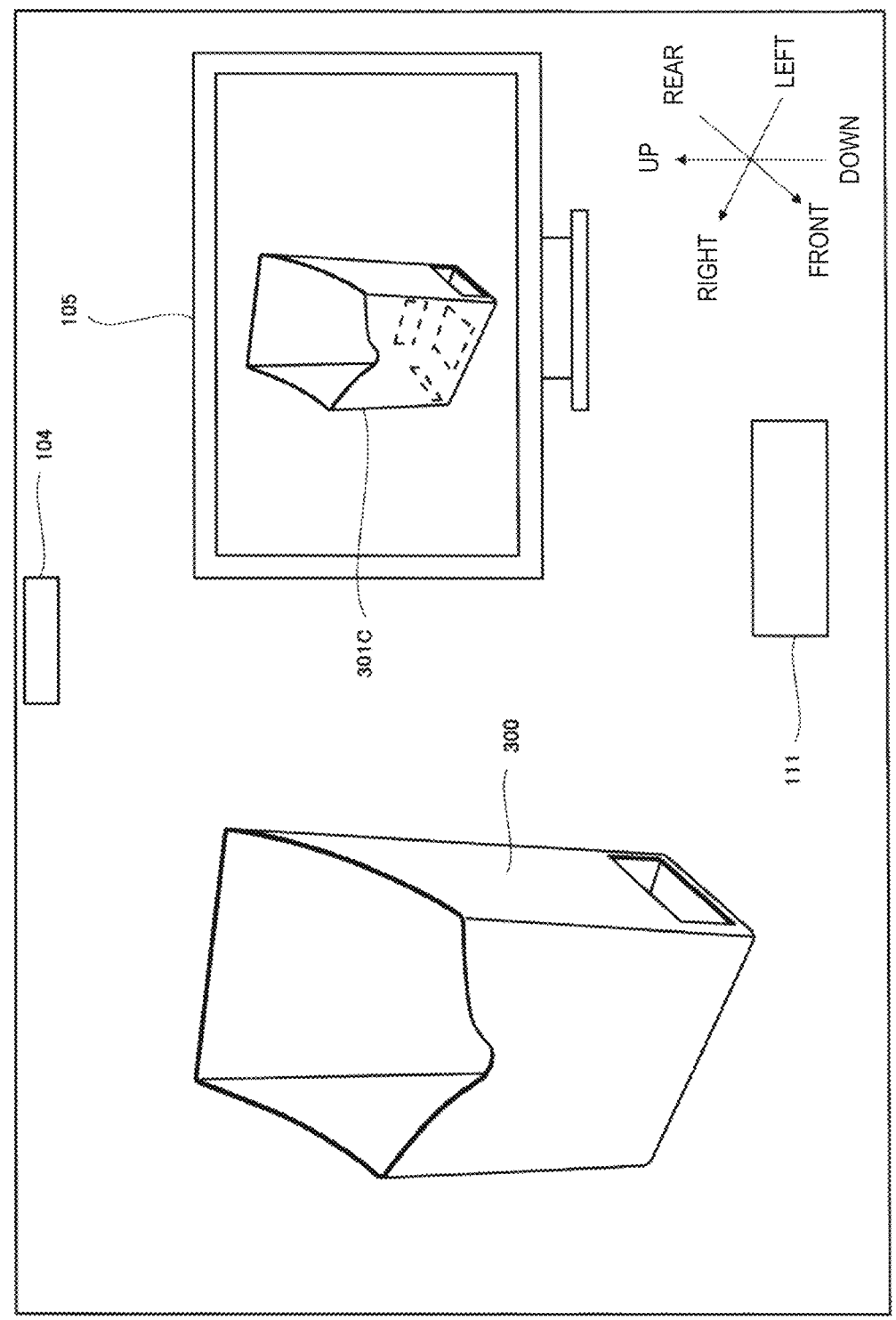
FIG. 9 is a schematic diagram illustrating the state inside the manipulation area when the robot system operates in accordance with the flowchart illustrated in FIG. 3.

Next, the first control device 111 displays the three-dimensional model of the workpiece 300 formed by the processing of Step S105 on the display 105 as a 3D workpiece 301C (Step S106; see FIG. 9). Therefore, the 3D workpiece 301C in which the rectangular through-holes are formed in lower parts of left and right side surfaces, the lower part of the rear surface, and the bottom surface of the workpiece 300 is displayed on the display 105. Therefore, the operator can recognize that the formation of the three-dimensional model of the workpiece 300 is finished, and he/she makes the input device etc. output the three-dimensional model formation end information to the first control device 111.

Therefore, the first control device 111 determines that the model formation end information is inputted from the input device etc. (Yes at Step S107), outputs the three-dimensional model of the workpiece 300 formed at Step S105 to the second control device 112, and ends this program.

Note that the processor 111*a* of the first control device 111 may store in the memory 111*b* the data of the three-dimensional model of the workpiece 300 (3D workpiece 301C) formed at Step S105, as first data.

In the robot system 100 according to Embodiment 1, since the first control device 111 forms the three-dimensional model of the workpiece based on the image information on the workpiece 300 imaged by the 3D camera 103, and the position information and the posture information on the 3D camera 103 when the 3D camera 103 images the workpiece 300, a programmer is not necessary to create the three-dimensional model data of the workpiece, thereby reducing the cost for creating the data. Thus, as compared with the conventional display system, it can improve the production efficiency.

Further, in the robot system 100 according to Embodiment 1, since the first control device 111 displays the formed three-dimensional model of the workpiece 300 on the display 105, the operator can judge whether there still is a non-imaged part in the workpiece 300. Further, the operator can understand which direction is better for an efficient imaging of the workpiece 300 based on the three-dimensional model of the workpiece 300 displayed on the display 105.

Thus, as compared with the conventional display system, it can improve the efficiency of the formation of the three-dimensional model of the workpiece 300.

Further, in the robot system 100 according to Embodiment 1, since the first control device 111 displays the imaged workpiece 300 (the workpiece image 302A etc.) on the display 105, the operator can judge whether there still is a non-imaged part in the workpiece 300. Moreover, the operator can understand which direction is better for an efficient imaging of the workpiece 300 based on the workpiece 300 displayed on the display 105 (the workpiece image 302A etc.).

Thus, as compared with the conventional display system, it can improve the efficiency of the formation of the three-dimensional model of the workpiece 300.

When performing the acquisition of the image information on the workpiece 300 and the acquisition of the position information and the posture information on the 3D camera 103 only once, and displaying the image of the workpiece 300 or forming the three-dimensional model of the workpiece 300 only using the acquired information, the workpiece 300 cannot be displayed in the perfect form, and the three-dimensional model may not be formed in the perfect form. In order to display the image of the workpiece 300 or form the three-dimensional model of the workpiece 300 in a more perfect form, it is preferred to repeatedly performing the acquisition of the image information on the workpiece 300, the acquisition of the position information and the posture information on the 3D camera 103, and the display of the image information on the workpiece 300, and to again form the three-dimensional model using the image information on the workpiece 300 and the position information and the posture information on the 3D camera 103, which are acquired by repeatedly performing these processing. Various modes for this configuration will be described below.

In this embodiment, after repeatedly performing the processing which acquires the image information on the workpiece 300 imaged by the 3D camera 103 (Step S101), the processing which acquires, from the sensor 104, the position information and the posture information when the workpiece 300 is imaged by the 3D camera 103 (Step S102), and the processing which displays the acquired image information on the display 105 (Step S103), the first control device 111 may perform the processing which forms the three-dimensional model of the workpiece 300 based on the acquired image information, and the acquired position information and posture information (Step S105), the processing which displays the formed three-dimensional model on the display 105 (Step S106), and the processing which outputs the first data which is data of the formed three-dimensional model to the second control device 112 (Step S108).

Further, in this embodiment, after performing the processing which acquires the image information (Step S101), the processing which acquires, from the sensor 104, the position information and the posture information (Step S102), the processing which displays the acquired image information on the display 105 (Step S103), the processing which forms the three-dimensional model (Step S105), and the processing which displays the three-dimensional model on the display 105 (Step S106), the processing which acquires the image information (Step S101), the processing which acquires, from the sensor 104, the position information and the posture information (Step S102), and the processing which displays the acquired image information on the display 105 (Step S103) are repeated once or more. Then, the first control device 111 may perform, in the processing which forms the three-dimensional model (Step S105), the processing which forms the three-dimensional model based on the image information acquired at the Ath time, and the acquired position information and posture information, and the processing which again forms the three-dimensional model based on the three-dimensional model formed by the processing described above which forms the three-dimensional model, and the image information acquired at the Bth time (B≠A), and then perform the processing which displays the three-dimensional model on the display 105 (Step S106), and the processing which outputs the first data to the second control device 112 (Step S108).

Further, in this embodiment, after performing the processing which acquires the image information (Step S101), the processing which acquires, from the sensor 104, the position information and the posture information (Step S102), the processing which displays the acquired image information on the display 105 (Step S103), the processing which forms the three-dimensional model (Step S105), and the processing which displays the three-dimensional model on the display 105 (Step S106), the processing which acquires the image information (Step S101), the processing which acquires, from the sensor 104, the position information and the posture information (Step S102), and the processing which displays the acquired image information on the display 105 (Step S103) are repeated once or more. Then, the first control device 111 may perform, in the processing which forms the three-dimensional model (Step S105), the processing which forms the three-dimensional model based on the image information acquired at the Cth time, and the acquired position information and posture information, the processing which forms the three-dimensional model based on the image information acquired at the Dth time (D≠C), and the processing which again forms the three-dimensional model based on the three-dimensional model formed based on the image information acquired at the Cth time, and the acquired position information and posture information, and the three-dimensional model formed based on the image information acquired at the Dth time (D≠C), and then perform the processing which displays the three-dimensional model on the display 105 (Step S106), and the processing which outputs the first data to the second control device 112 (Step S108).

Note that, in this embodiment, the workarea 201 may be an explosion-proof area, and the manipulation area 202 may be a non-explosion-proof area. Therefore, when the first interface 121 and the 3D camera 103 are used inside the manipulation area 202, these devices become unnecessary to be explosion proof.

Note that, in Embodiment 1, although the first control device 111 determines whether the three-dimensional model formation end information is inputted in the processing of Step S107, it is not limited to this configuration. The first control device 111 may not perform the processing of Step S107.

[Modification 1]

Figure 10:
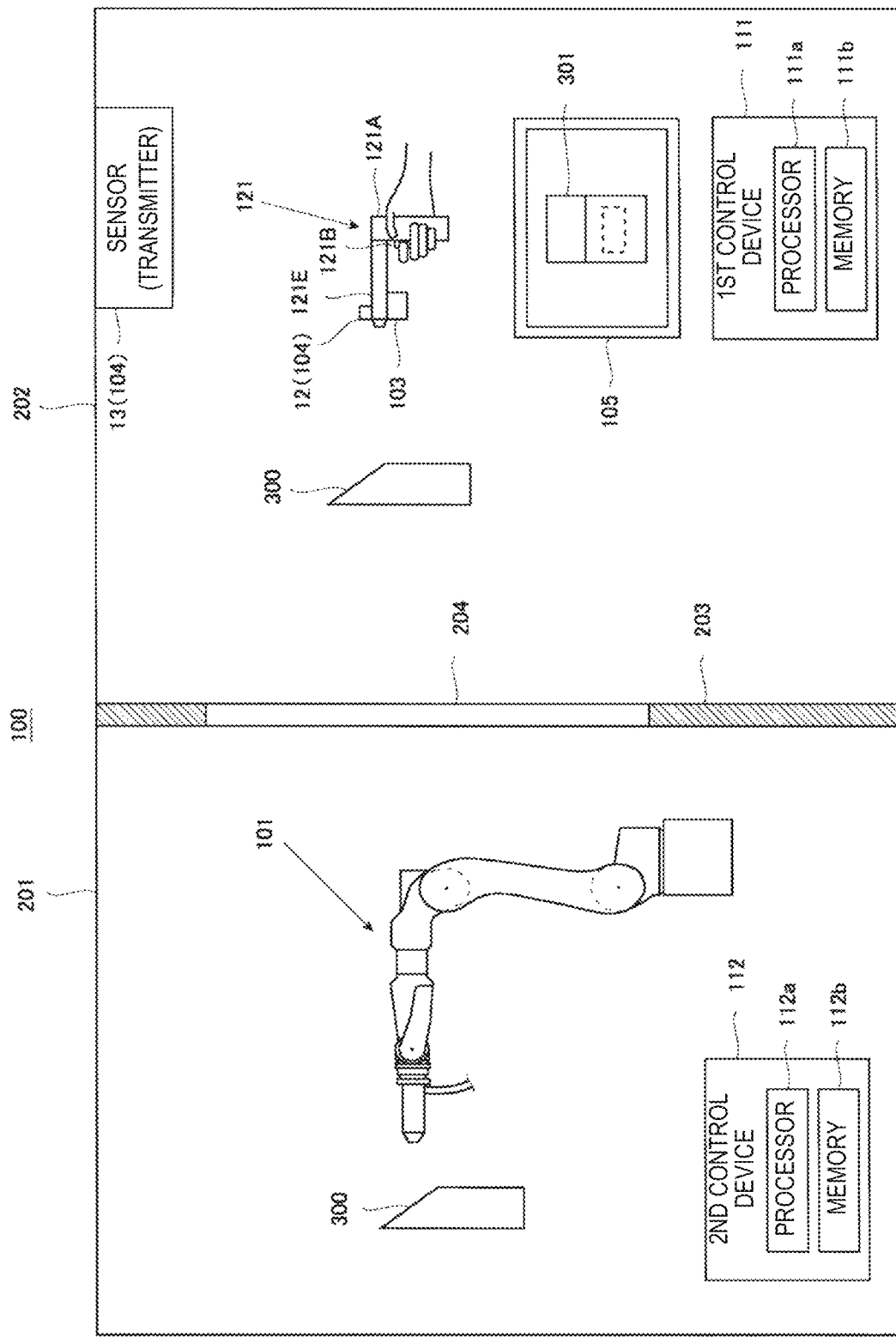
FIG. 10 is a schematic diagram illustrating an outline configuration of a robot system of Modification 1 in Embodiment 1.

FIG. 10 is a schematic diagram illustrating an outline configuration of a robot system of Modification 1 in Embodiment 1. The robot system 100 of Modification 1 differs from the robot system 100 according to Embodiment 1 in that a detector 12 and a transmitter 13 are provided to the first interface 121. The detector 12 detects the position information and the posture information on the first interface 121 and the 3D camera 103 wirelessly. The detector 12 is a gyro sensor or a camera, for example. The transmitter 13 transmits to the first control device 111 the position information and the posture information which are detected by the detector 12. In Modification 1, the detector 12 and the transmitter 13 correspond to the sensor 104. Note that the detector 12 may not detect the position information and the posture information, or the detector 12 may detect only the position information or may detect only the posture information.

The robot system 100 of Modification 1 has similar operation and effects to the robot system 100 according to Embodiment 1.

[Modification 2]

Figure 11:
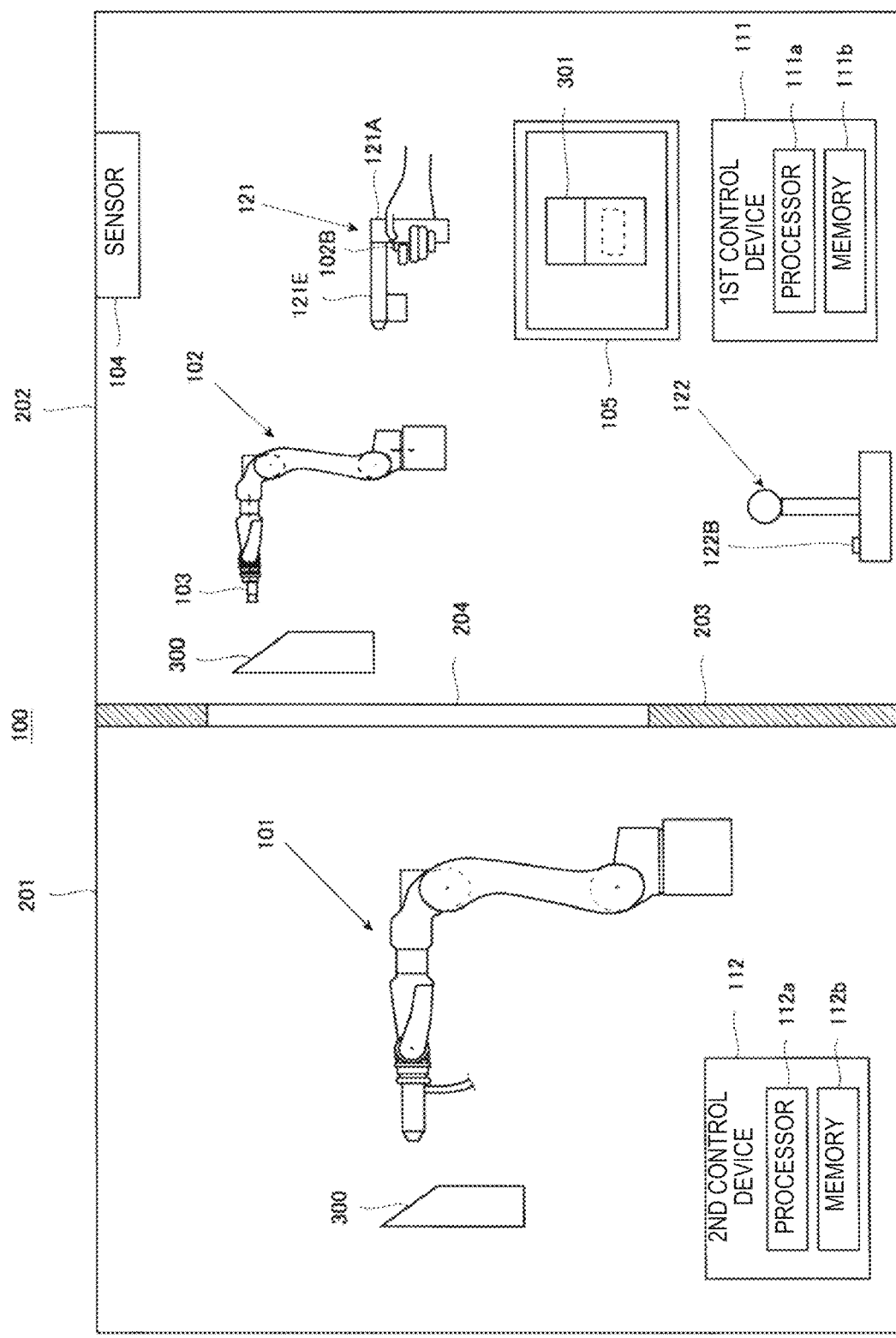
FIG. 11 is a schematic diagram illustrating an outline configuration of a robot system of Modification 2 in Embodiment 1.

FIG. 11 is a schematic diagram illustrating an outline configuration of a robot system of Modification 2 in Embodiment 1. The robot system 100 of Modification 2 differs from the robot system 100 according to Embodiment 1 in that the 3D camera 103 is provided to the tip-end part of a robotic arm 102, and a second interface 122 is additionally provided.

The robotic arm 102 may be a vertical articulated robotic arm, or may be a horizontal articulated robot. The robotic arm 102 is operated by the second interface 122. The second interface 122 may be a known interface, such as a joystick, a keyboard, ten keys, and a teach pendant, for example. A switch 122B for instructing start/stop of imaging by the 3D camera 103 is provided to the second interface 122.

Note that the first interface 121 may also serve as the second interface 122. In this case, a switch (changeover switch) which switches between operation of the robot 101 and operation of the robotic arm 102 may be provided to the first interface 121.

The robot system 100 of Modification 2 has similar operation and effects to the robot system 100 according to Embodiment 1.

In Modification 2, since the 3D camera 103 is provided to the tip-end part of the robotic arm 102, and the second interface 122 for manipulating the robotic arm 102 is further provided, it becomes easy to acquire the image information on the workpiece 300 near the robot 101.

Further, in Modification 2, the first control device 111 also serves as the second control device 112. That is, the first control device 111 also realizes the function of the second control device 112. Therefore, since the functions of the two kinds of control devices can be implemented by the sole control device, the configuration, such as wiring, can be simplified.

Embodiment 2

[Configuration of Robot System]

Figure 12:
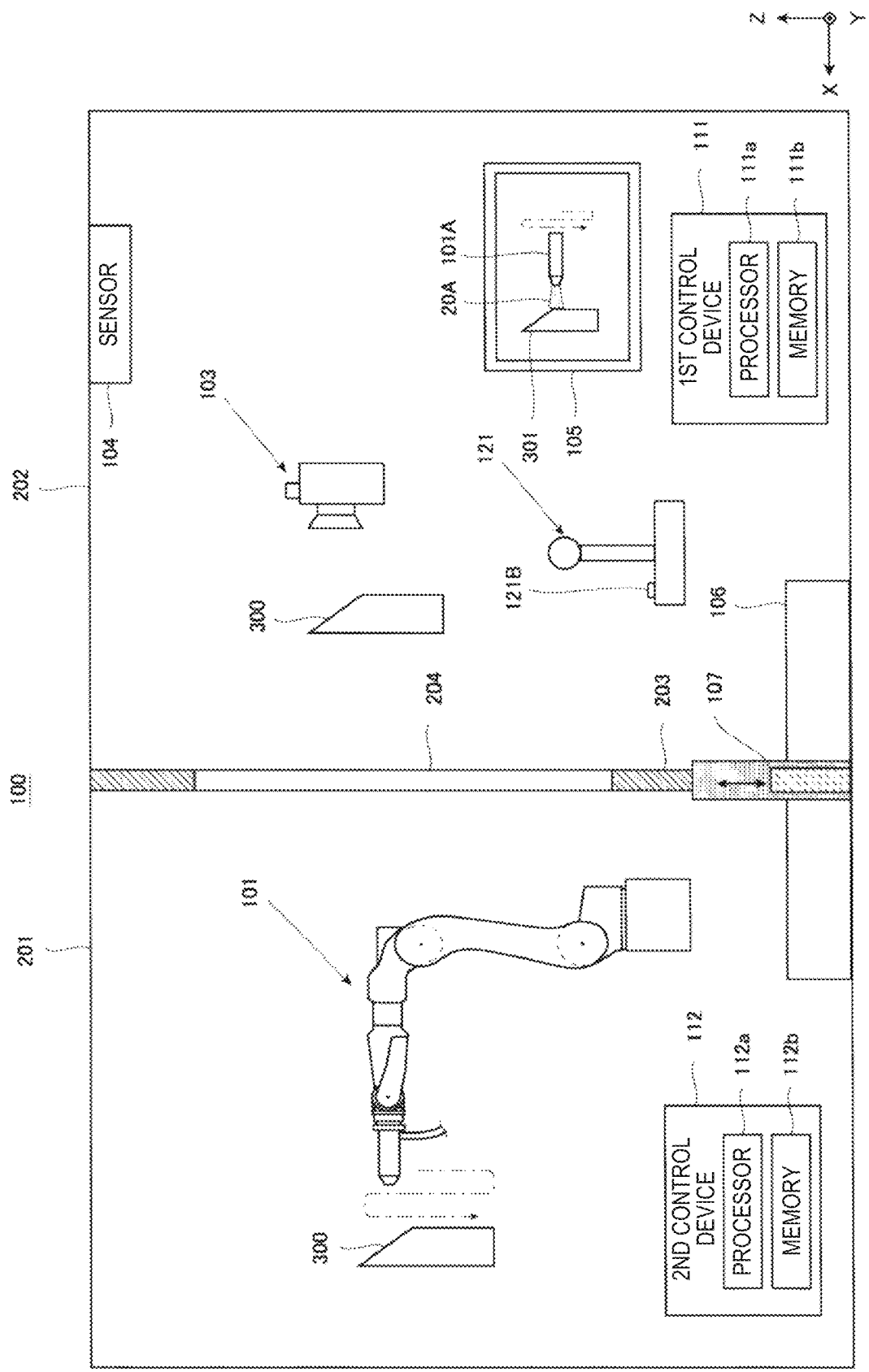
FIG. 12 is a schematic diagram illustrating an outline configuration of a robot system according to Embodiment 2.

FIG. 12 is a schematic diagram illustrating an outline configuration of a robot system according to Embodiment 2. Note that, in FIG. 12 the directions of the robot are expressed by the directions of the X-axis, the Y-axis, and the Z-axis in the three-dimensional rectangular coordinate system which are illustrated in this drawing for convenience. The robot system 100 according to Embodiment 2 differs from the robot system according to Embodiment 1 (including its modifications) in that a conveying device 106 is additionally provided. The conveying device 106 conveys the workpiece from the manipulation area to a first position in the workarea which is set beforehand. The conveying device 106 is a known conveying device, such as a belt conveyor.

Note that the robot system 100 according to Embodiment 2 may be provided with a shutter 107 etc. which permits/inhibits a movement of the workpiece 300 from the manipulation area 202 into the workarea 201.

Further, in Embodiment 2, the first interface 121 is a joystick, and the first interface 121 is configured separately from the 3D camera 103.

Further, the memory 112b of the second control device 112 may store three-dimensional model information on the scale, indicative of a given first range set beforehand. The three-dimensional model information on the scale may be, for example, information on a ruler for measuring a distance from a tip end of the robot 101, or may be information on a cone (truncated cone) shape indicative of a range where grains, fluid, or gas is injected.

[Operation and Effects of Robot System]

Next, operation and effects of the robot system 100 according to Embodiment 2 are described in detail with reference to FIGS. 12 to 14. Note that the following operation is performed by the processor 112a of the second control device 112 reading the program stored in the memory 112b.

Figure 13:
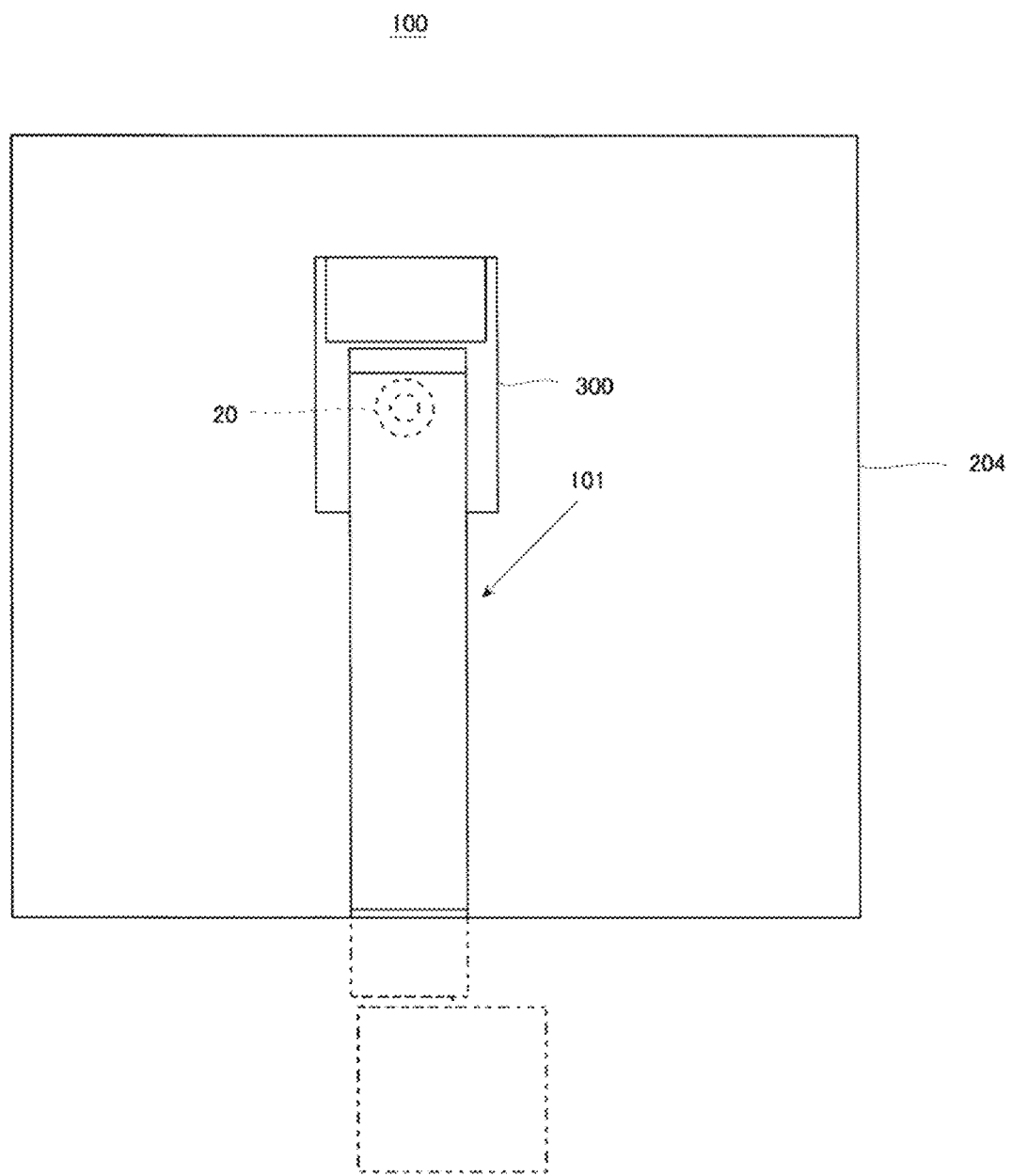
FIG. 13 is a schematic diagram illustrating a state of a workarea seen from a window, in the robot system illustrated in FIG. 12.
Figure 14:
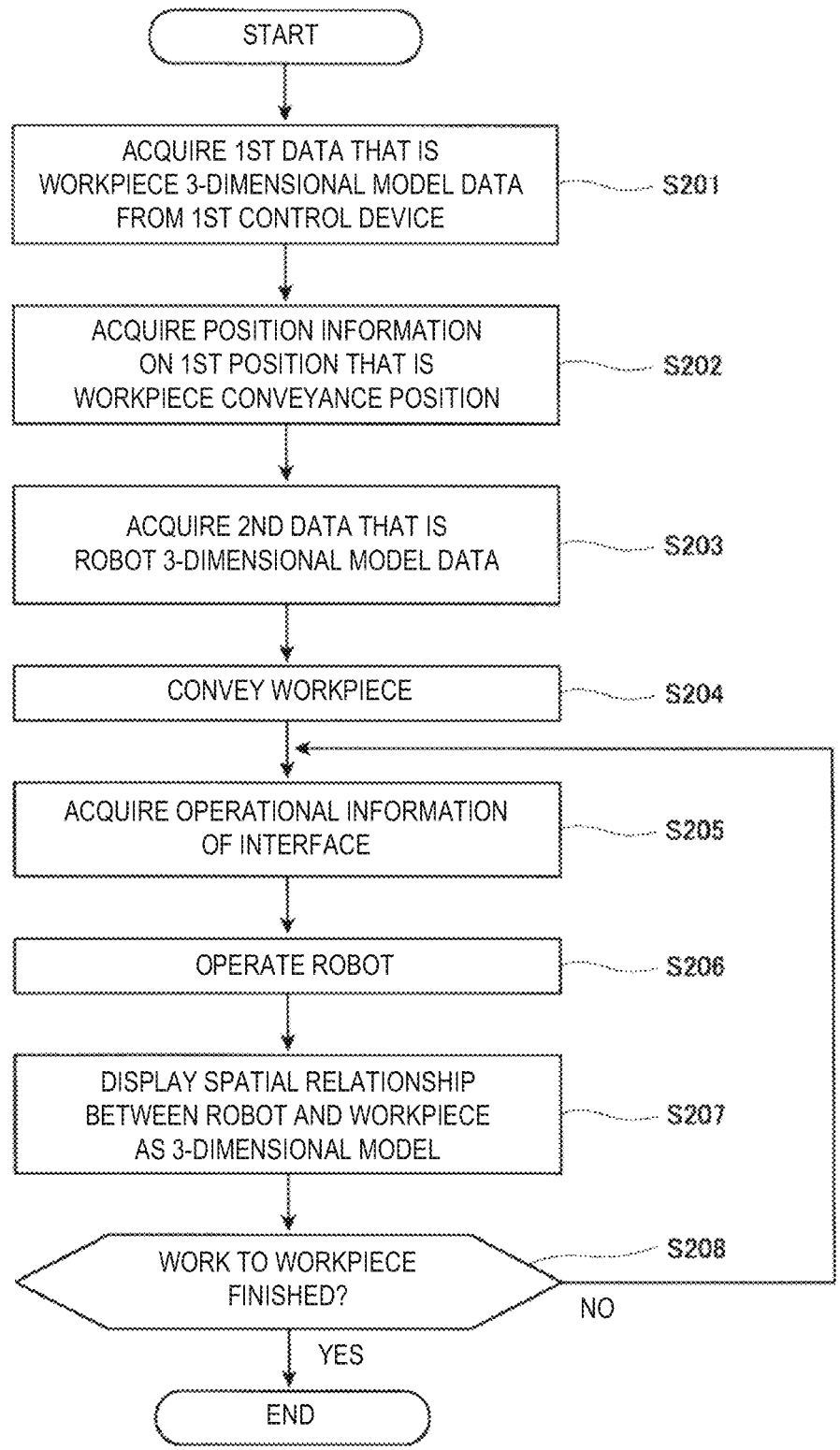
FIG. 14 is a flowchart illustrating one example of operation of the robot system according to Embodiment 2.

FIG. 13 is a schematic diagram illustrating a state of the workarea seen from a window, in the robot system illustrated in FIG. 12. FIG. 14 is a flowchart illustrating one example of operation of the robot system according to Embodiment 2. As illustrated in FIG. 13, when the operator looks at the workarea 201 from the window 204, the workpiece 300 and the robot 101 may overlap with each other. Further, a spatial relationship between the tip-end part of the robot 101 (end effector 20) and the workpiece 300 may be difficult to be grasped. In this case, it may be possible to install a camera inside the workarea 201, to image the tip-end part of the robot 101 (end effector 20) and the workpiece 300, and to display the captured image for the operator.

However, when the robot 101 paints the workpiece 300 or welds the workpiece 300, it is necessary to have the camera installed in the explosion-proof workarea 201. The explosion-proof camera is high in cost, and therefore, the facility cost increases. When the size of the workpiece to be painted changes, the imaging location of the camera may be necessary to be changed, and therefore, the operator's work load increases.

Therefore, in the robot system 100 according to Embodiment 2, the second control device 112 performs the following operation (processing) by using the three-dimensional model of the workpiece 300 created by the first control device 111.

First, suppose that instruction information indicative of that a work (for example, painting work) is to be performed to the workpiece 300 is inputted into the second control device 112 via the input device etc. (not illustrated) by the operator. As illustrated in FIG. 14, the processor 112a of the second control device 112 acquires the first data which is three-dimensional model data of the workpiece 300 from the memory 111b of the first control device 111 (Step S201). Note that, if the first data is stored in the memory 112b, the processor 112a may acquire the first data from the memory 112b.

Next, the processor 112a of the second control device 112 acquires the position information on the first position that is a conveyance position of the workpiece 300 inside the workarea 201 from the memory 112b (Step S202).

Next, the processor 112a of the second control device 112 acquires second data which is the three-dimensional model data of the robot 101 from the memory 112b (Step S203). Note that, as for the second data, the data with which the programmer formed the three-dimensional model of the robot 101 may be stored beforehand in the memory 112b. Further, as described for the operation of the robot system 100 according to Embodiment 1, as for the second data, the first control device 111 may form the three-dimensional model of the robot 101 by using the 3D camera 103 installed in the first interface 121, and may store this three-dimensional model data in the memory 112b.

Next, the processor 112a of the second control device 112 makes the conveying device 106 convey the workpiece 300 disposed in the manipulation area 202 to the first position in the workarea 201 (Step S204). Note that the second control device 112 may perform beforehand the processing of Steps S201 to S203 before the instruction information is inputted from the input device etc., or may perform it after the processing of Step S204.

Next, the processor 112a of the second control device 112 acquires manipulation information (operational information) of the robot 101 outputted from the first interface 121 when the operator operates the first interface 121 (Step S205). Next, the processor 112a of the second control device 112 operates the robot 101 based on the manipulation information acquired at Step S205 (Step S206).

Next, the processor 112a of the second control device 112 displays the spatial relationship between the tip-end part of the robot 101 (end effector 20) and the workpiece 300 on the display 105 as the three-dimensional model based on the first data, the first position, and the second data which are acquired by the processing of Steps S201 to S203, and the manipulation information acquired at Step S205 (Step S207).

In detail, the processor 112a of the second control device 112 displays on the display 105 the 3D workpiece 301 and a 3D robot 101A in a state where the workpiece and the robot are seen from a direction different from the direction in which the operator looks at the robot 101 from the manipulation area 202.

Here, the direction in which the operator looks at the robot 101 from the manipulation area 202 may be a direction in which he/she looks at the robot 101 from the window 204 of the manipulation area 202 (here, X-direction), for example. Further, for example, a motion sensor may be disposed inside the manipulation area 202, and the direction may be a direction of a straight line which connects coordinates of the operator's position detected by the motion sensor and coordinates of the position of the robot 101.

Further, the direction different from the direction in which the operator looks at the robot 101 from the manipulation area 202 may be any direction in Embodiment 2, as long as it is a direction other than the X-direction, and, for example, it may be a direction perpendicular to the X-direction (here, Y-direction or Z-direction).

Therefore, the processor 112a of the second control device 112 may display on the display 105 the 3D workpiece 301 and the 3D robot 101A as they are seen from the direction different from the direction (here, the X-direction) in which the operator looks at the robot 101 from the window 204 of the manipulation area 202, for example.

In more detail, as illustrated in FIG. 12, the processor 112a of the second control device 112 may display on the display 105 the spatial relationship between the tip-end part of the robot 101 (end effector 20) when seen from the Y-direction and the workpiece 300.

Note that, in the processing of Step S207, the processor 112a of the second control device 112 may display on the display 105 a 3D scale 20A which is a three-dimensional model of the scale at the tip end of the end effector 20 of the robot 101 (3D robot 101A) (see FIG. 12).

Next, the processor 112a of the second control device 112 determines whether the instruction information indicative of an end of the work for the workpiece 300 is inputted via the input device etc. (not illustrated) by the operator (Step S208).

If determined that the instruction information indicative of the end of the work for the workpiece 300 is not inputted (No at Step S208), the processor 112a of the second control device 112 repeats the processing of Steps S205 to S208 until it determines that the instruction information indicative of the end of the work for the workpiece 300 is inputted.

On the other hand, if determined that the instruction information indicative of the end of the work for the workpiece 300 is inputted (Yes at Step S208), the processor 112a of the second control device 112 ends this program.

Thus, in the robot system 100 according to Embodiment 2, the second control device 112 displays the spatial relationship between the tip-end part of the robot 101 (end effector 20) and the workpiece 300 on the display 105 as the three-dimensional model, using the three-dimensional model of the workpiece 300 created by the first control device 111.

Therefore, since it is not necessary to create the three-dimensional model data of the workpiece by the programmer, the cost for creating the data can be reduced. Thus, as compared with the conventional display system, it can improve the production efficiency.

Further, in the robot system 100 according to Embodiment 2, since the second control device 112 displays on the display 105 the 3D scale 20A at the tip end of the end effector 20 of the robot 101 (3D robot 101A), the operator's burden can be reduced, and the work efficiency can be improved.

In this embodiment, it is further provided with the conveying device 106 which conveys the workpiece 300 from the manipulation area 202 to the first position in the workarea 201 which is set beforehand. Therefore, it can move the workpiece 300 imaged in the manipulation area 202 by the 3D camera 103 to the exact position suitable for the work.

Further, in this embodiment, the first interface 121 which operates the robot 101 and is disposed inside the manipulation area 202 is further provided. The second control device 112 has the memory 112b which stores the second data which is data of the three-dimensional model of the robot 101. Further, when the operator operates the first interface 121 to manipulate the robot 101 to perform the work for the workpiece 300, the second control device 112 displays on the display 105 the spatial relationship between the workpiece 300 and the tip-end part of the robot 101 in a state where the workpiece and the robot are seen from the direction different from the direction in which the operator looks at the robot 101 from the manipulation area 202, based on the first data inputted by the output of the first data to the second control device 112, the position information of the first position of the conveyed workpiece, the second data, and the manipulation information on the robot 101 inputted from the first interface 121. According to the above configuration, the operator can understand now the spatial relationship between the workpiece 300 and the tip-end part of the robot 101 which is hardly understood by directly looking at the robot 101 and the workpiece 300.

Further, in this embodiment, the 3D camera 103 is attached to the first interface 121. According to this configuration, since the device which the operator should grip is a sole object, it becomes easier to operate the first interface 121 and the 3D camera 103.

Further, in this embodiment, the sensor 104 may detect the position information and the posture information wirelessly from the first interface 121, and the second control device 112 may calculate the locus of the first interface 121 based on the position information and the posture information from the first interface 121 which are detected by the sensor 104, and may perform the processing which operates the robot 101 on real time based on the calculated locus (Step S206). Thus, since it becomes easier to move the first interface 121, the robot 101 can be operated correctly.

Note that the second control device 112 may store in the memory 112b the work performed by the robot 101 (the operational information on the first interface 121) based on the manipulation information which is produced by the operator operating the first interface 121. Further, the second control device 112 may automatically operate the robot 101 according to the operational information on the first interface 121 stored in the memory 112b.

[Modification 1]
[Configuration of Robot System]

Figure 15:
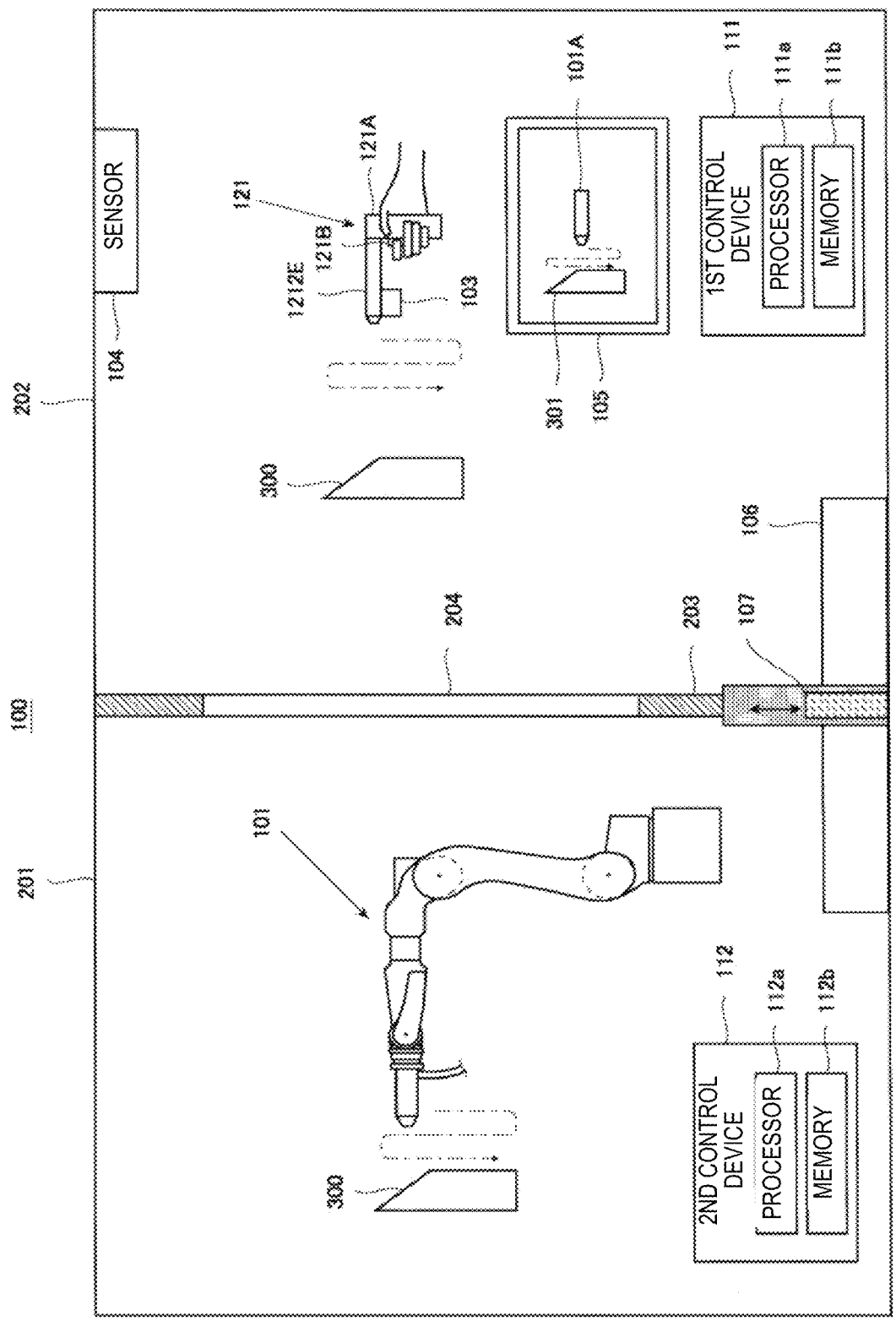
FIG. 15 is a schematic diagram illustrating an outline configuration of a robot system of Modification 1 in Embodiment 2.

FIG. 15 is a schematic diagram illustrating an outline configuration of a robot system of Modification 1 in Embodiment 2. The robot system 100 of Modification 1 differs from the robot system 100 according to Embodiment 2 in that the second control device 112 operates the robot 101 (end effector 20), based on the position information and the posture information on the first interface 121 inputted from the sensor 104, so as to follow the movement of the tip-end part of the first interface 121.

That is, in Modification 1, the second control device 112 calculates the locus of the first interface 121 based on the position information and the posture information on the first interface 121 which are detected by the sensor 104, and operates the robot 101 on real time. The second control device 112 may calculate the locus of the first interface 121 based on the position information and the posture information in a three-dimensional space of the first interface 121 which are detected by the sensor 104, and based on the calculated locus, it may cause the robot 101 on real time to perform any work of an injecting work which injects fluid or gas to the workpiece 300, a cutting work which cuts the workpiece 300, a polishing work which polishes the workpiece 300, a welding work which welds the workpiece 300, and a washing work which washes the workpiece 300. The "work" of the injecting work, the cutting work, the polishing work, the welding operation, and the washing work is a series of operations performed to the workpiece 300 by the robot 101, and is a concept which includes a plurality of operations. The work includes, for example, an operation in which the robot 101 approaches the workpiece 300, an operation in which the robot 101 starts injection of fluid etc. to the workpiece 300, an operation in which the robot 101 stops the injection of the fluid etc., and an operation in which the robot 101 separates from the workpiece 300.

[Operation and Effects of Robot System]

Operation and effects of the robot system 100 of Modification 1 in Embodiment 2 are described in detail with reference to FIGS. 15 and 16. Note that the following operation is performed by the processor 112a of the second control device 112 reading the program stored in the memory 112b.

Figure 16:
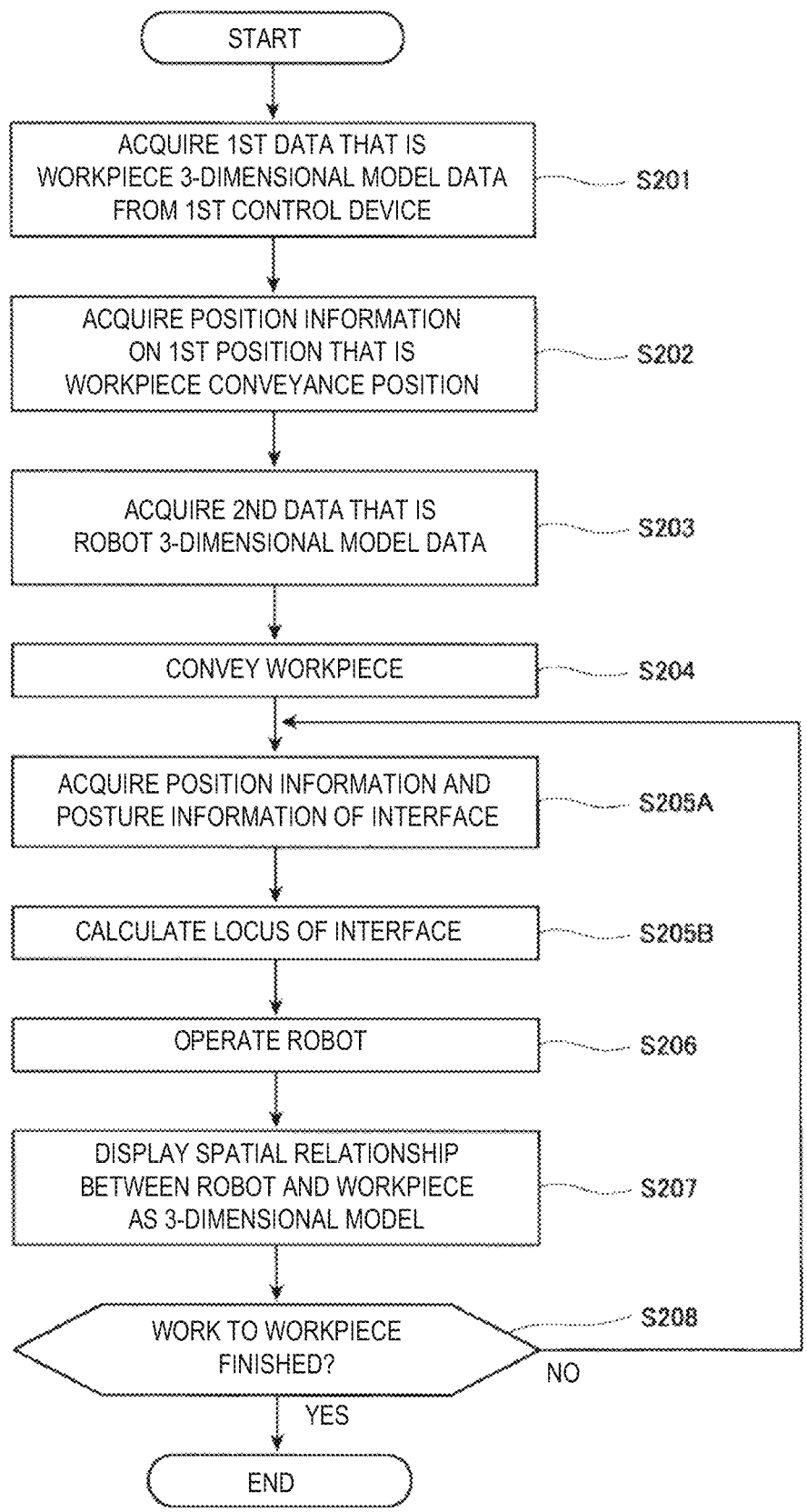
FIG. 16 is a flowchart illustrating one example of operation of the robot system of Modification 1 in Embodiment 2.

FIG. 16 is a flowchart illustrating one example of operation of the robot system of Modification 1 in Embodiment 2. As illustrated in FIG. 16, the operation of the robot system 100 of Modification 1 differs from the operation of the robot system 100 according to Embodiment 2 in that processing (operation) of Steps S205A and S205B is performed, instead of the processing of Step S205.

In detail, the processor 112a of the second control device 112 acquires, from the sensor 104, the position information and the posture information on the first interface 121 detected by the sensor 104 (Step S205A). Next, the processor 112a of the second control device 112 calculates the locus of the first interface 121 based on the position information and the posture information on the first interface 121 which are acquired at Step S205 (Step S205B).

Next, the processor 112a of the second control device 112 operates the robot 101 on real time based on the locus of the first interface 121 calculated at Step S205B (Step S206).

Next, the processor 112a of the second control device 112 displays the spatial relationship between the tip-end part of the robot 101 (end effector 20) and the workpiece 300 on the display 105 as the three-dimensional model based on the first data, the first position, and the second data which are acquired by the processing of Steps S201 to S203, and the locus of the first interface 121 calculated at Step S205B (Step S207). In detail, as illustrated in FIG. 15, the second control device 112 displays the 3D workpiece 301 and the 3D robot 101A on the display 105.

Next, the processor 112a of the second control device 112 determines whether the instruction information indicative of the end of the work for the workpiece 300 is inputted via the input device etc. (not illustrated) by the operator (Step S208).

If determined that the instruction information indicative of the end of the work for the workpiece 300 is not inputted (No at Step S208), the processor 112a of the second control device 112 repeats the processing of Steps S205A to S208 until it determines that the instruction information indicative of the end of the work for the workpiece 300 is inputted.

On the other hand, if determined that the instruction information indicative of the end of the work for the workpiece 300 is inputted (Yes at Step S208), the processor 112a of the second control device 112 ends this program.

In the robot system 100 of Modification 1, the second control device 112 calculates the locus of the first interface 121 based on the position information and the posture information on the first interface 121 which are detected by the sensor 104, and operates the robot 101 on real time.

Therefore, since the operator can operate the robot 101 on real time, he/she can operate the robot 101 intuitively. Further, he/she can instantly judge whether the work operation by the robot 101 to the workpiece 300 is performed correctly.

Further, in the robot system 100 of Modification 1, the second control device 112 displays the spatial relationship between the tip-end part of the robot 101 (end effector 20) and the workpiece 300 on the display 105 as the three-dimensional model, using the three-dimensional model of the workpiece 300 created by the first control device 111.

Therefore, since it is not necessary to create the three-dimensional model data of the workpiece by the programmer, the cost for creating the data can be reduced. Thus, as compared with the conventional display system, it can improve the production efficiency.

In Modification 1, the second control device 112 may have the memory 112b which stores the second data which is data of the three-dimensional model of the robot 101. The second control device 112 may display on the display 105 the spatial relationship between the workpiece 300 and the tip-end part of the robot 101 as they are seen from the direction different from the direction in which the operator looks at the robot 101 from the manipulation area 202, based on the first data inputted by the processing which outputs the first data to the second control device 112 (Step S108), the position information on the first position of the conveyed workpiece 300, the second data, and the locus calculated by the processing which operates the robot 101 on real time (Step S206). Thus, the operator can understand now the spatial relationship between the workpiece 300 and the tip-end part of the robot 101 which is hardly understood by directly looking at the robot 101 and the workpiece 300.

Note that the second control device 112 may calculate the locus of the first interface 121 which is produced by the operator moving (operating) the first interface 121, and store in the memory 112*b* the work which is performed by the robot 101 (locus information on the first interface 121) based on the calculated locus. Further, the second control device 112 may operate the robot 101 according to the locus information on the first interface 121 stored in the memory 112*b*.

[Modification 2]

Figure 17:
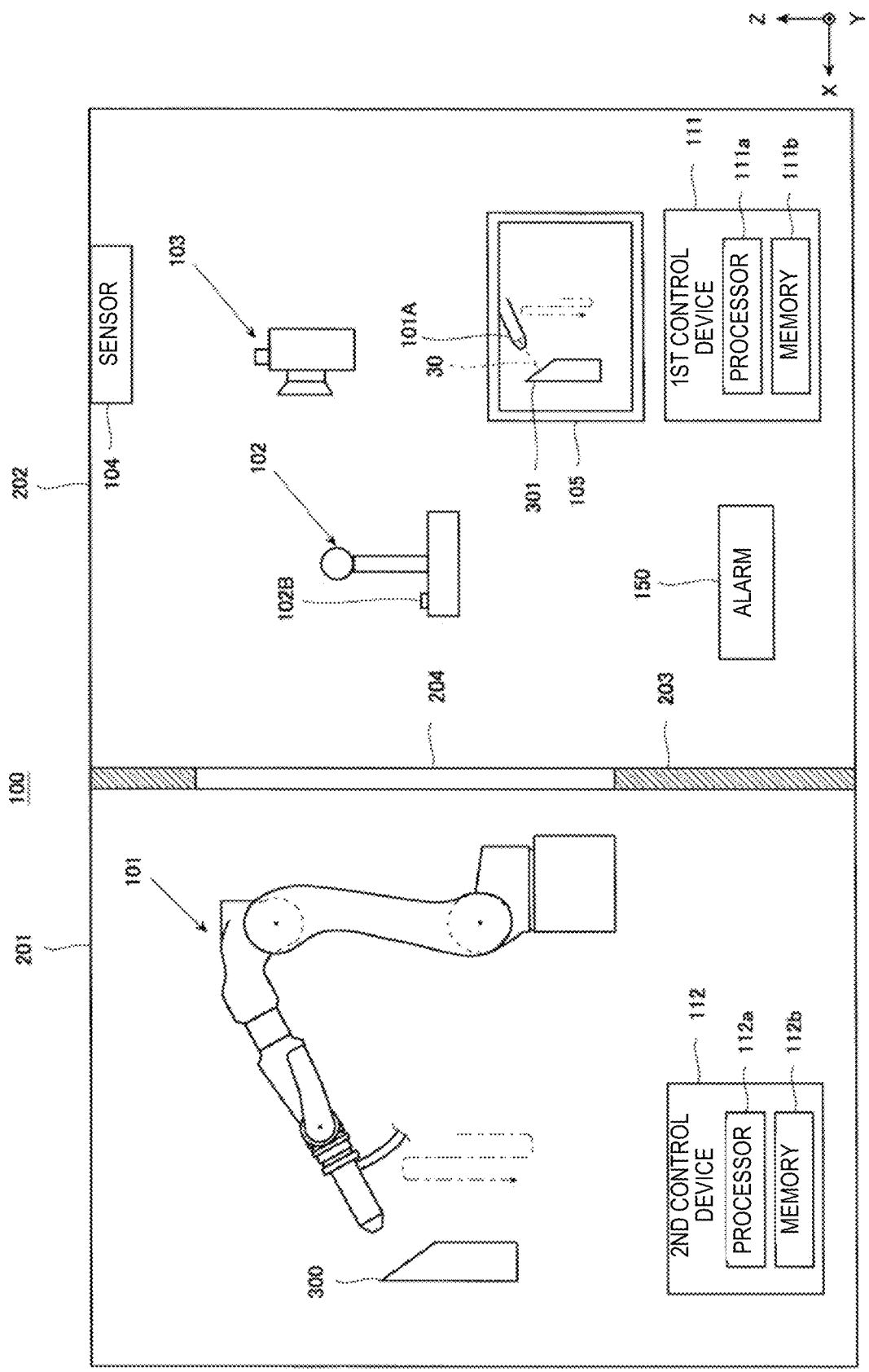
FIG. 17 is a schematic diagram illustrating an outline configuration of a robot system of Modification 2 in Embodiment 2.
Figure 18:
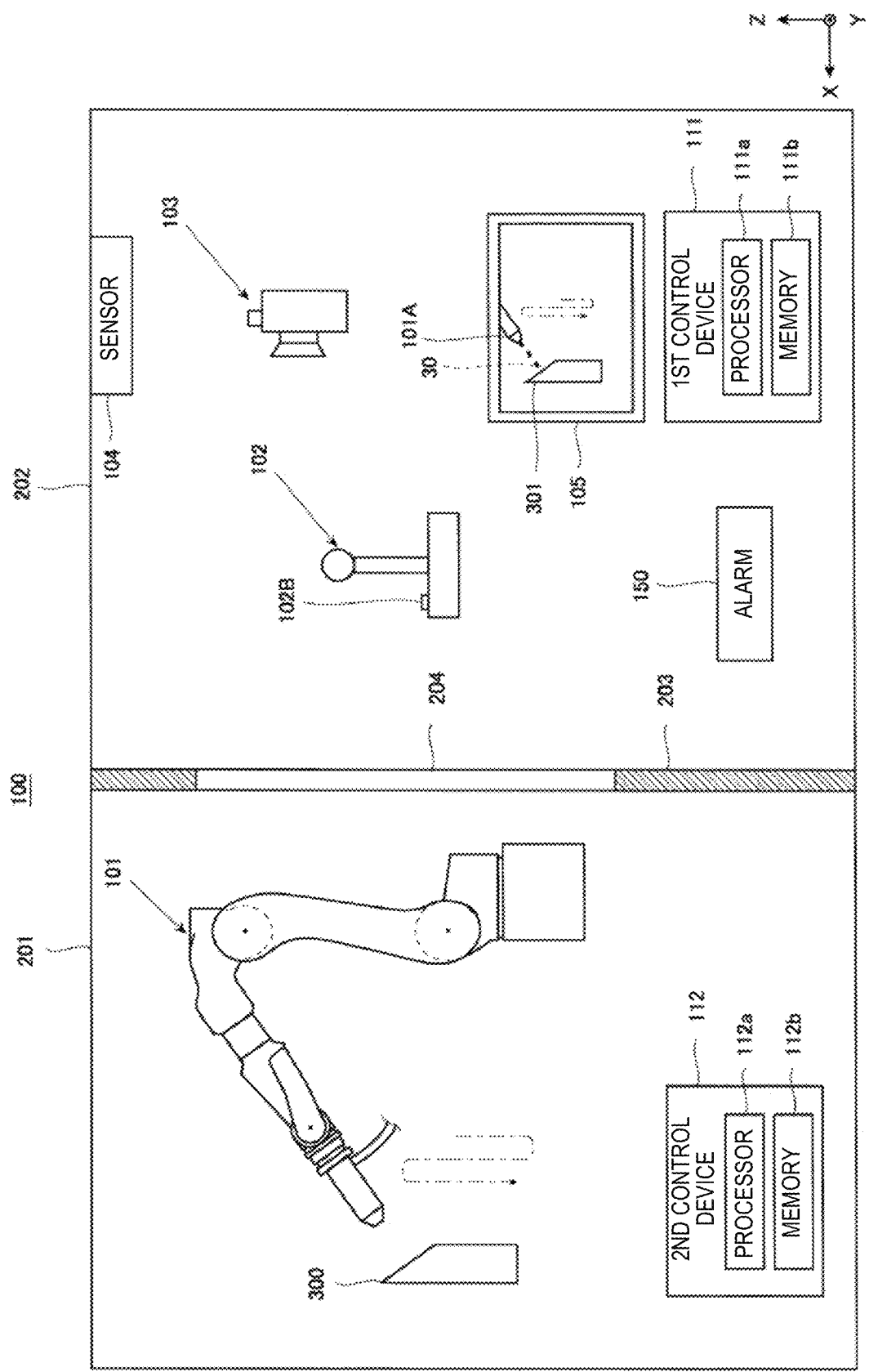
FIG. 18 is a schematic diagram illustrating the outline configuration of the robot system of Modification 2 in Embodiment 2.

FIGS. 17 and 18 are schematic diagrams illustrating an outline configuration of a robot system of Modification 2 in Embodiment 2. Note that, in FIGS. 17 and 18, the directions of the robot are expressed as the directions of the X-axis, the Y-axis, and the Z-axis in the three-dimensional rectangular coordinate system illustrated in the drawings, for convenience. As illustrated in FIGS. 17 and 18, the robot system 100 of Modification 2 differs from the robot system 100 according to Embodiment 2 in that the second control device 112 displays on the display 105 a line 30 indicative of a normal direction of a given first part of the workpiece 300, which is set beforehand, based on the three-dimensional model information on the workpiece 300. The first part may be a part which opposes to the tip end of the end effector 20 of the robot 101.

The robot system 100 of Modification 2 may further be provided with an alarm 150. The alarm 150 may display character data or image data on the display 105, or may inform by sound from a speaker etc., or may inform by light or color. Alternatively, it may inform a smartphone, a cellular phone, or a tablet computer by an e-mail or an application via a communication network.

Further, in the robot system 100 of Modification 2, when the line 30 becomes in agreement with the axial center direction of the end effector 20 of the robot 101 (the end effector 20 of the 3D robot 101A), the second control device 112 may change the color and/or the thickness of the line 30, and display it on the display 105 (see FIG. 18).

Further, when the line 30 becomes in agreement with the axial center direction of the end effector 20 of the robot 101 (the end effector 20 of the 3D robot 101A), the second control device 112 may activate the alarm 150 and inform the agreement.

The robot system 100 of Modification 2 has similar operation and effects to the robot system 100 according to Embodiment 2.

Embodiment 3

[Configuration of Robot System]

Figure 19:
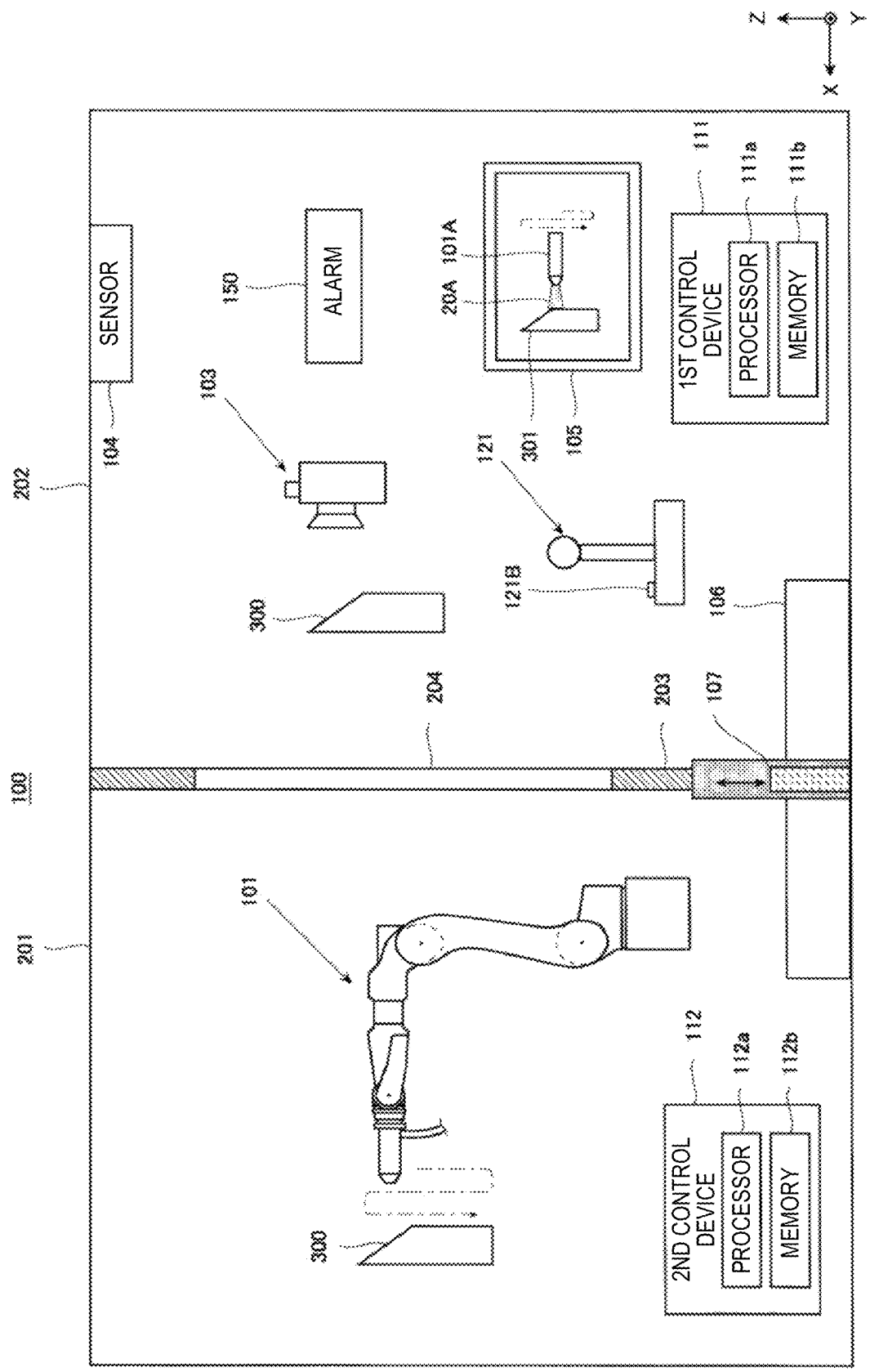
FIG. 19 is a schematic diagram illustrating an outline configuration of a robot system according to Embodiment 3.

FIG. 19 is a schematic diagram illustrating an outline configuration of a robot system according to Embodiment 3. Note that, in FIG. 19, the directions of the robot are expressed as the directions of the X-axis, the Y-axis, and the Z-axis in the three-dimensional rectangular coordinate system illustrated in the drawing, for convenience.

As illustrated in FIG. 19, the robot system 100 according to

Embodiment 3 differs from the robot system 100 according to Embodiment 2 in that the alarm 150 is disposed inside the manipulation area 202. The alarm 150 may display character data or image data on the display 105, or may inform by sound from a speaker etc., or may inform by light or color. Alternatively, it may inform a smartphone, a cellular phone, or a tablet computer by an e-mail or an application via a communication network.

[Operation and Effects of Robot System]

Next, operation and effects of the robot system 100 according to Embodiment 3 are described in detail with reference to FIGS. 19, 20A, and 20B. Note that the following operation is performed by the processor 112*a* of the second control device 112 reading the program stored in the memory 112*b*.

Figure 20A:
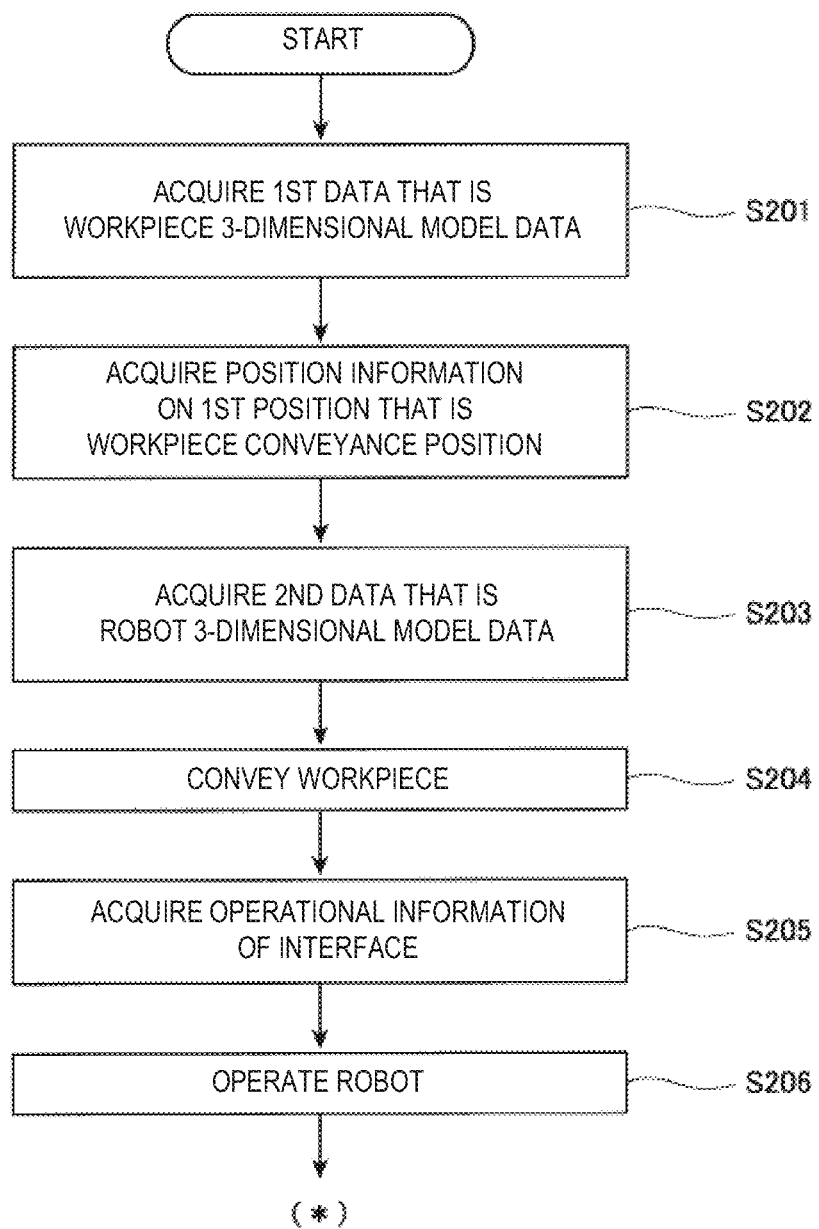
FIG. 20A is a flowchart illustrating one example of operation of the robot system according to Embodiment 3.
Figure 20B:
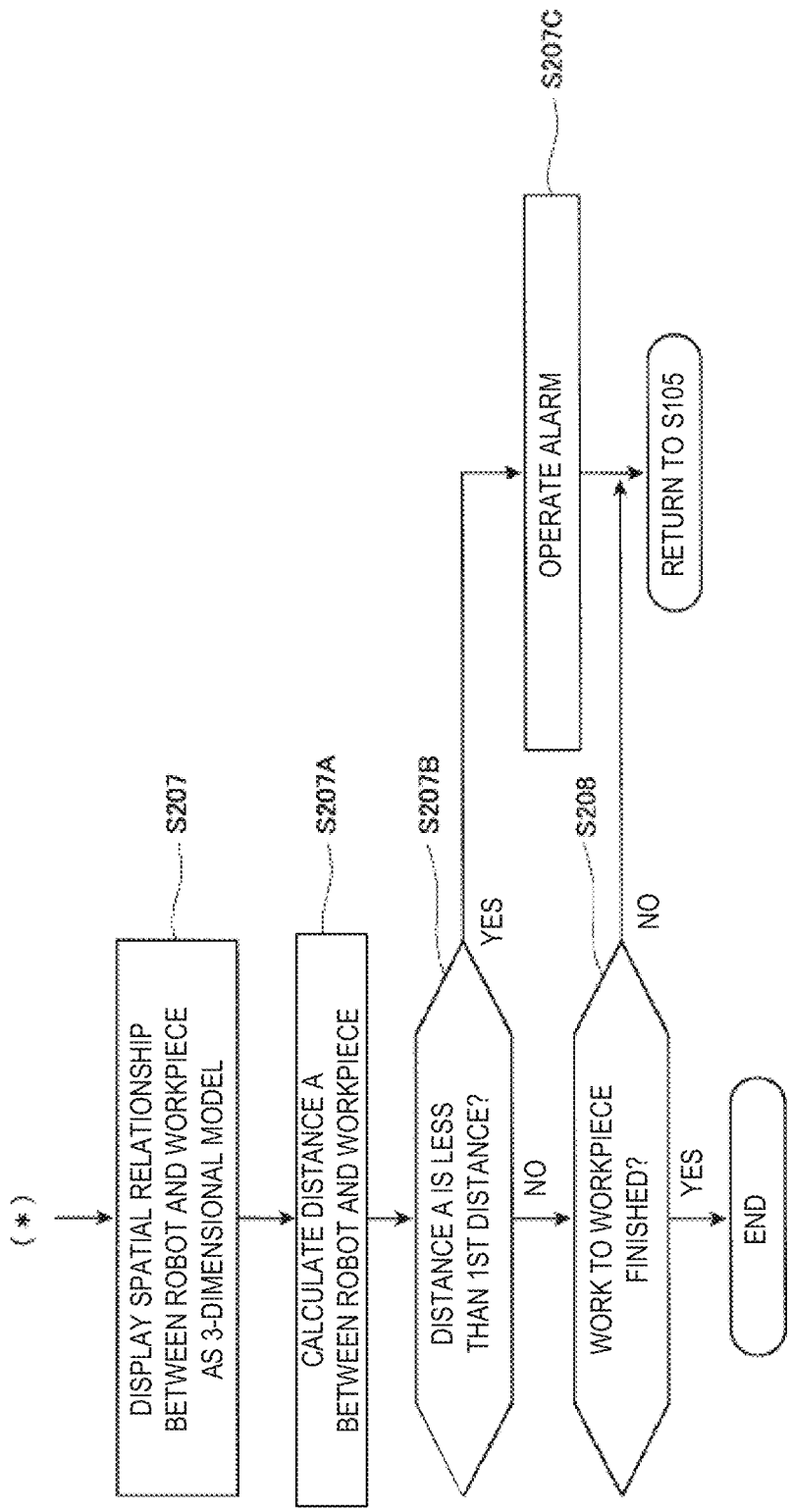
FIG. 20B is a flowchart illustrating one example of the operation of the robot system according to Embodiment 3.

FIGS. 20A and 20B are flowcharts illustrating one example of operation of the robot system according to Embodiment 3. As illustrated in FIGS. 20A and 20B, the operation of the robot system 100 according to Embodiment 3 differs from the operation of the robot system 100 according to Embodiment 2 in that processing of Steps S207A to S207C is performed between Step S207 and Step S208.

In detail, the processor 112*a* of the second control device 112 displays the spatial relationship between the tip-end part of the robot 101 (end effector 20) and the workpiece 300 on the display 105 as the three-dimensional model based on the first data, the first position, and the second data which are acquired by the processing of Steps S201 to S203, and manipulational command information acquired at Step S205 (Step S207).

Next, the processor 112*a* of the second control device 112 calculates a distance A between the robot 101 (3D robot 101A) and the workpiece 300 (3D workpiece 301) based on the first data and the second data, and the manipulational command information acquired at Step S205 (Step S207A).

Here, the processor 112*a* of the second control device 112 may calculate a distance between a part of the robot 101 (3D robot 101A) nearest to the workpiece 300 (3D workpiece 301) and the workpiece 300 (3D workpiece 301).

That is, when the tip end of the end effector 20 of the robot 101 is located at the position nearest to the workpiece 300, the processor 112*a* of the second control device 112 may calculate a distance between the tip end of the end effector 20 and the workpiece 300. Moreover, when a certain part of the robot 101 is located at the position nearest to the workpiece 300, the processor 1112 of the second control device 112 may calculate a distance between this part of the robot 101 and the workpiece 300.

Next, the processor 112*a* of the second control device 112 determines whether the distance A calculated at Step S207A is less than a given first distance set beforehand (Step S207B). Here, the first distance may be set based on the operating speed of the robot 101, the contents of the work for the workpiece 300, etc.

If the operating speed of the robot 101 is slower, the first distance may be set smaller. Further, also when the work for the workpiece 300 is welding, cutting, washing, and polishing work, the first distance may be set smaller.

On the other hand, when the operating speed of the robot 101 is faster, the first distance may be set larger. Further, also when the work for the workpiece 300 is injecting/spraying work of fluid, the first distance may be set larger.

For example, the first distance may be 0.5 cm or more from the viewpoint of suppressing a collision with the workpiece 300, and may be 30 cm from the viewpoint of performing the work to the workpiece 300.

If determined that the distance A is less than the first distance (Yes at Step S207B), the processor 112*a* of the second control device 112 activates the alarm 150 to inform a warning about a possibility of collision with the workpiece 300 (Step S207C). Here, the processor 112*a* of the second control device 112 may reduce the operating speed of the robot 101, or may stop the robot 101.

Therefore, the operator can recognize the possibility of the robot 101 colliding with the workpiece 300, and can operate the robot 101 by using the interface 102 so that the robot 101 does not collide the workpiece 300.

Therefore, the processor 112*a* of the second control device 112 acquires the manipulational command information inputted from the interface 102. That is, the processor 112*a* of the second control device 112 returns to the processing of Step S205.

On the other hand, if determined that the distance A is not less than the first distance (No at Step S207B), the processor 112*a* of the second control device 112 determines whether the instruction information indicative of the end of the work for the workpiece 300 is inputted via the input device etc. (not illustrated) by the operator (Step S208).

If determined that the instruction information indicative of the end of the work for the workpiece 300 is not inputted (No at Step S208), the processor 112*a* of the second control device 112 repeats the processing of Steps S205 to S208 until it determines that the instruction information indicative of the end of the work for the workpiece 300 is inputted.

On the other hand, if determined that the instruction information indicative of the end of the work for the workpiece 300 is inputted (Yes at Step S208), the processor 112*a* of the second control device 112 ends this program.

The robot system 100 according to Embodiment 3 has similar operation and effects to the robot system 100 according to Embodiment 2.

In this embodiment, it is further provided with the conveying device 106 which conveys the workpiece 300 from the manipulation area 202 to the first position in the work-area 201 which is set beforehand. Thus, the workpiece 300 imaged by the 3D camera 103 in the manipulation area 202 can be moved to the exact position suitable for the work.

Further, in this embodiment, the first interface 121 which operates the robot 101 and is disposed inside the manipulation area 202 is further provided. The second control device 112 has the memory 112*b* which stores the second data which is data of the three-dimensional model of the robot 101. Further, when the operator operates the first interface 121 to manipulate the robot 101 to perform the work for the workpiece 300, the second control device 112 displays on the display 105 the spatial relationship between the workpiece 300 and the tip-end part of the robot 101 as they are seen from the direction different from the direction in which the operator looks at the robot 101 from the manipulation area 202 based on the first data inputted by the output of the first data to the second control device 112, the position information on the first position of the conveyed workpiece, the second data, and the manipulation information on the robot 101 inputted from the first interface 121. According to the above configuration, the operator can understand now the spatial relationship between the workpiece 300 and the tip-end part of the robot 101 which is hardly understood by directly looking at the robot 101 and the workpiece 300.

Further, in this embodiment, the 3D camera 103 is attached to the first interface 121. According to this configuration, since the device which the operator should grip is a sole object, it becomes easier to operate the first interface 121 and the 3D camera 103.

Further, in this embodiment, the sensor 104 may detect the position information and the posture information from the first interface 121 wirelessly, and the second control device 112 may calculate the locus of the first interface 121 based on the position information and the posture information from the first interface 121 which are detected by the sensor 104, and may perform the processing which operates the robot 101 on real time based on the calculated locus (Step S206). Thus, since it becomes easier to move the first interface 121, the robot 101 can be operated correctly.

It is apparent for the person skilled in the art that many improvements or other embodiments of the present disclosure are possible from the above description. Therefore, the above description is to be interpreted only as illustration, and it is provided in order to teach the person skilled in the art the best mode that implements the present disclosure. The details of the structures and/or the functions may be changed substantially, without departing from the present disclosure.

The invention claimed is:

1. A robot system, comprising:
a robot installed in a work area;
a three-dimensional (3D) camera operated by an operator;
a sensor that is disposed in a manipulation area that is a space different from the work area, and wirelessly detects position information and posture information on the 3D camera;
a display;
first control circuitry configured to:
acquire image information on a workpiece imaged by the 3D camera;
acquire, from the sensor, the position information and the posture information when the workpiece is imaged by the 3D camera;
display the image information on the display;
form a 3D model of the workpiece based on the image information, the position information and the posture information;
display the 3D model of the workpiece on the display; and
output first data of the 3D model of the workpiece to second control circuitry which controls the robot;
a conveying device that conveys the workpiece from the manipulation area to a first position in the work area; and
a first interface that manipulates the robot, the first interface disposed in the manipulation area, wherein the second control circuitry includes a memory which stores second data of a 3D model of the robot, and when the operator operates the first interface to manipulate the robot to perform a work for the workpiece, the second control circuitry is configured to display on the display a spatial relationship between the workpiece and a tip-end part of the robot in a state where the workpiece and the robot are seen from a direction different from a direction in which the operator looks at the robot from the manipulation area, based on the first data, first position information indicating the first position, the second data and manipulation information to manipulate the robot input from the first interface.

2. The robot system of claim 1, wherein after repeated acquisition of the image information, acquisition of the position information and the posture information from the sensor, and the display of the image information on the display, the first control circuitry is configured to form the 3D model of the workpiece, display of the 3D model of the workpiece on the display, and output the first data to the second control circuitry.

3. The robot system of claim 1, wherein after acquisition of the image information, acquisition of the position information and the posture information from the sensor, display of the image information on the display, formation of the 3D model of the workpiece, and display of the formed 3D model of the workpiece on the display:
the first control circuitry acquires the image information, acquires the position information and the posture information from the sensor, and displays the image information on the display, once or more;
the first control circuitry then forms the 3D model of the workpiece based on the image information acquired at an Ath time, and the position information and the posture information;
the first control circuitry again forms the 3D model of the workpiece based on the formed 3D model of the workpiece, and the image information acquired at a Bth time (B #A); and
the first control circuitry then displays the formed 3D model of the workpiece on the display, and outputs the first data to the second control circuitry.

4. The robot system of claim 1, wherein after acquisition of the image information, acquisition of the position information and the posture information from the sensor, display of the image information on the display, formation of the 3D model, and display of the formed 3D model on the display:
the first control circuitry acquires the image information, acquires the position information and the posture information from the sensor, and displays the image information on the display, once or more;
the first control circuitry then forms the 3D model of the workpiece based on the image information acquired at a Cth time, and the position information and the posture information;
the first control circuitry forms the 3D model of the workpiece based on the image information acquired at a Dth time (D #C);
the first control circuitry again forms the 3D model of the workpiece based on the 3D model of the workpiece formed based on the image information acquired at the Cth time, and the position information and the posture information, and the 3D model of the workpiece formed based on the image information acquired at the Dth time (D #C); and
the first control circuitry then displays the formed 3D model of the workpiece on the display, and outputs the first data to the second control circuitry.

5. The robot system of claim 1, wherein the 3D camera is attached to the first interface.

6. The robot system of claim 5, wherein
the sensor wirelessly detects the position information and the posture information from the first interface; and
the second control circuitry calculates a locus of the first interface based on the position information and the posture information from the first interface, that are detected by the sensor, and operates the robot on real time based on the calculated locus.

7. The robot system of claim 1, wherein the work area is an explosion-proof area, and the manipulation area is a non-explosion-proof area.

8. The robot system of claim 1, wherein
the robot includes a robotic arm;
the tip-end part is a tip-end part of the robotic arm; and
the robot system further comprises a second interface that operates the robotic arm.

9. The robot system of claim 1, wherein the first control circuitry is the second control circuitry.

10. A method of forming a three-dimensional (3D) model of a workpiece, the method comprising:
detecting, by a sensor disposed in a manipulation area, position information and posture information of a 3D camera operated by an operator when the 3D camera images the workpiece, wherein the workpiece is disposed in the manipulation area and the manipulation area is a space different from a work area in which a robot is installed;
acquiring image information on the imaged workpiece;
acquiring the position information and the posture information from the sensor;
displaying the image information on a display;
forming the 3D model of the workpiece based on the image information, the position information and the posture information;
displaying the 3D model of the workpiece on the display; and
outputting first data of the 3D model of the workpiece to control circuitry which controls the robot, the control circuitry including a memory which stores second data of a 3D model of the robot;
conveying the workpiece from the manipulation area to a first position in the work area;
manipulating the robot via a first interface disposed in the manipulation area; and
when the operator operates the first interface to manipulate the robot to perform a work for the workpiece, displaying on the display a spatial relationship between the workpiece and a tip-end part of the robot in a state where the workpiece and the robot are seen from a direction different from a direction in which the operator looks at the robot from the manipulation area, based on the first data, first position information indicating the first position, the second data and manipulation information to manipulate the robot input from the first interface.

11. The method of claim 10, wherein the 3D camera is attached to the first interface.

12. The method of claim 11, wherein
the sensor wirelessly detects the position information and the posture information from the first interface, and
the method further comprises calculating a locus of the first interface based on the position information and the posture information from the first interface, that are detected by the sensor, and operates the robot on real time based on the calculated locus.

13. The method of claim 10, wherein the work area is an explosion-proof area, and the manipulation area is a non-explosion-proof area.

14. The method of claim 10, wherein
the robot includes a robotic arm, and
the tip-end part is a tip-end part of the robotic arm.

* * * * *